United States Patent
Hormuth et al.

(10) Patent No.: US 11,288,008 B1
(45) Date of Patent: Mar. 29, 2022

(54) REFLECTIVE MEMORY SYSTEM

(71) Applicant: Dell Products L.P., Round Rock, TX (US)

(72) Inventors: Robert W. Hormuth, Cedar Park, TX (US); Jimmy D. Pike, Georgetown, TX (US); Gaurav Chawla, Austin, TX (US); William Price Dawkins, Lakeway, TX (US); Elie Jreij, Pflugerville, TX (US); Mukund P. Khatri, Austin, TX (US); Walter A. O'Brien, III, Westborough, MA (US); Mark Steven Sanders, Roanoke, VA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/085,183

(22) Filed: Oct. 30, 2020

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
None
See application file for complete search history.

(56) References Cited

U.S. PATENT DOCUMENTS 5,905,998 A * 5/1999 Ebrahim ............. G06F 12/0822
                                                        711/144

OTHER PUBLICATIONS

"A Modern Alternative to Relflective Memory and VME", (c) 2010 United Electronic Industries, Inc., p. 1-14.*
Jovanovic et al., "An Overview of Reflective Memory Systems", (c) 1999 IEEE, p. 1-9.*
Wikipedia "Reflective Memory—Wikipedia," This Page was Last Edited on Jan. 25, 2019, at 18:08 (UTC), 2 Pages, Printed from https://en.wikipedia.org/wiki/Reflective_memory on Oct. 29, 2020.
Ruggles, Gary "Introducing the Compute Express Link (CXL) standard: the hardware," Tech Design Forum, Posted: Sep. 11, 2019, 2 Pages https://www.techdesignforums.com/practice/technique/compute-express-link-cx-hardware/.

* cited by examiner

*Primary Examiner* — Brian R Peugh
(74) *Attorney, Agent, or Firm* — Joseph Mencher

(57) ABSTRACT

A reflective memory system includes network-connected computing systems including respective memory subsystems. A reflective memory management subsystem in a first computing system receives a processor memory-centric reflective write request associated with a local reflective memory write operation and remote reflective memory write operations, performs the local reflective memory write operation to write data to a memory subsystem in the first computing system, and uses remote memory access hardware to generate remote memory write information for performing the remote reflective memory write operations to write the data at respective second memory subsystems in second computing systems. The reflective memory management subsystem then instructs a networking device in the first computing system to utilize the remote memory write information to transmit first memory access communications that provide for the performance of the remote reflective memory write operations to write the data at the second memory subsystem in each second computing system.

20 Claims, 18 Drawing Sheets

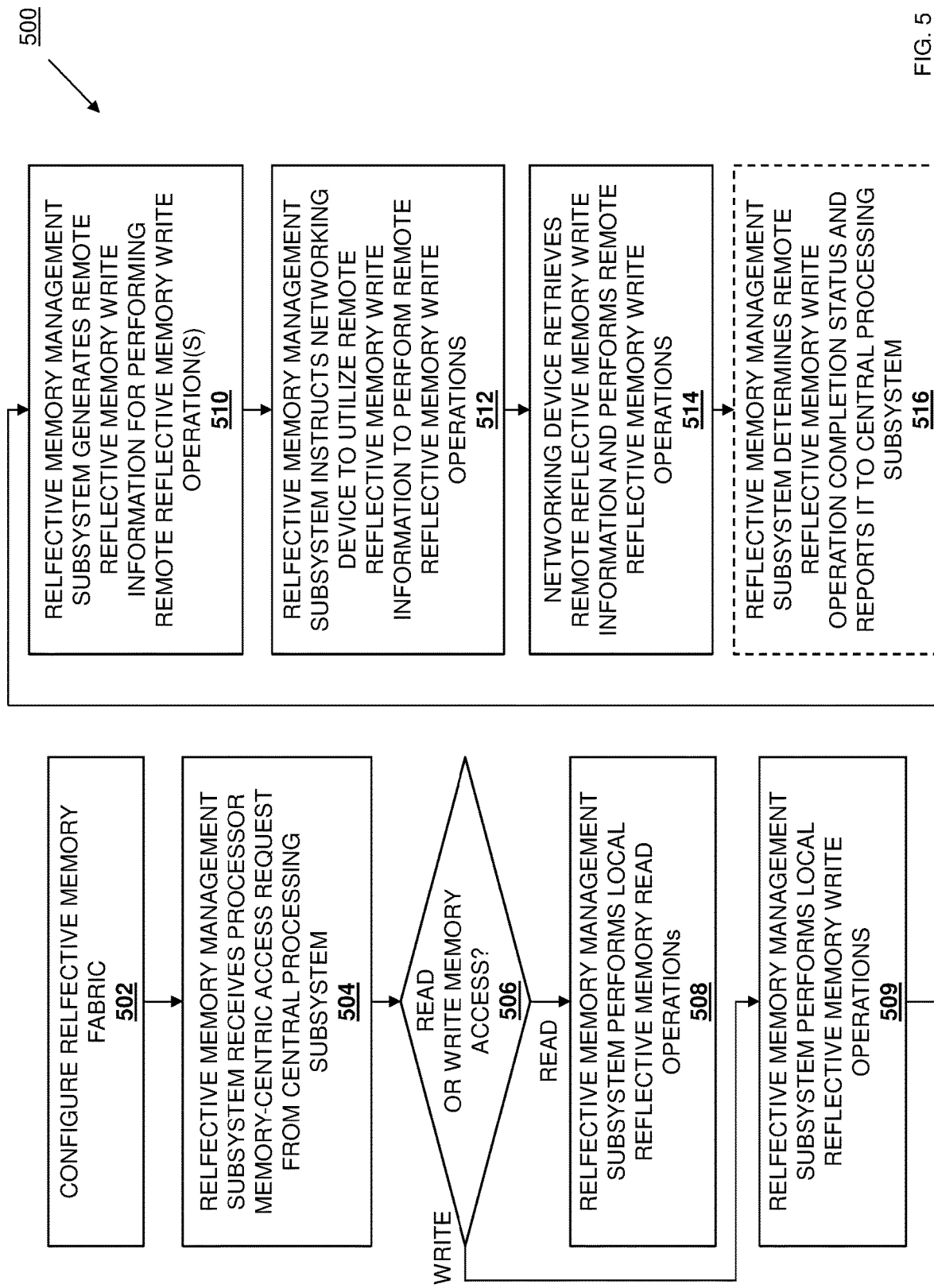

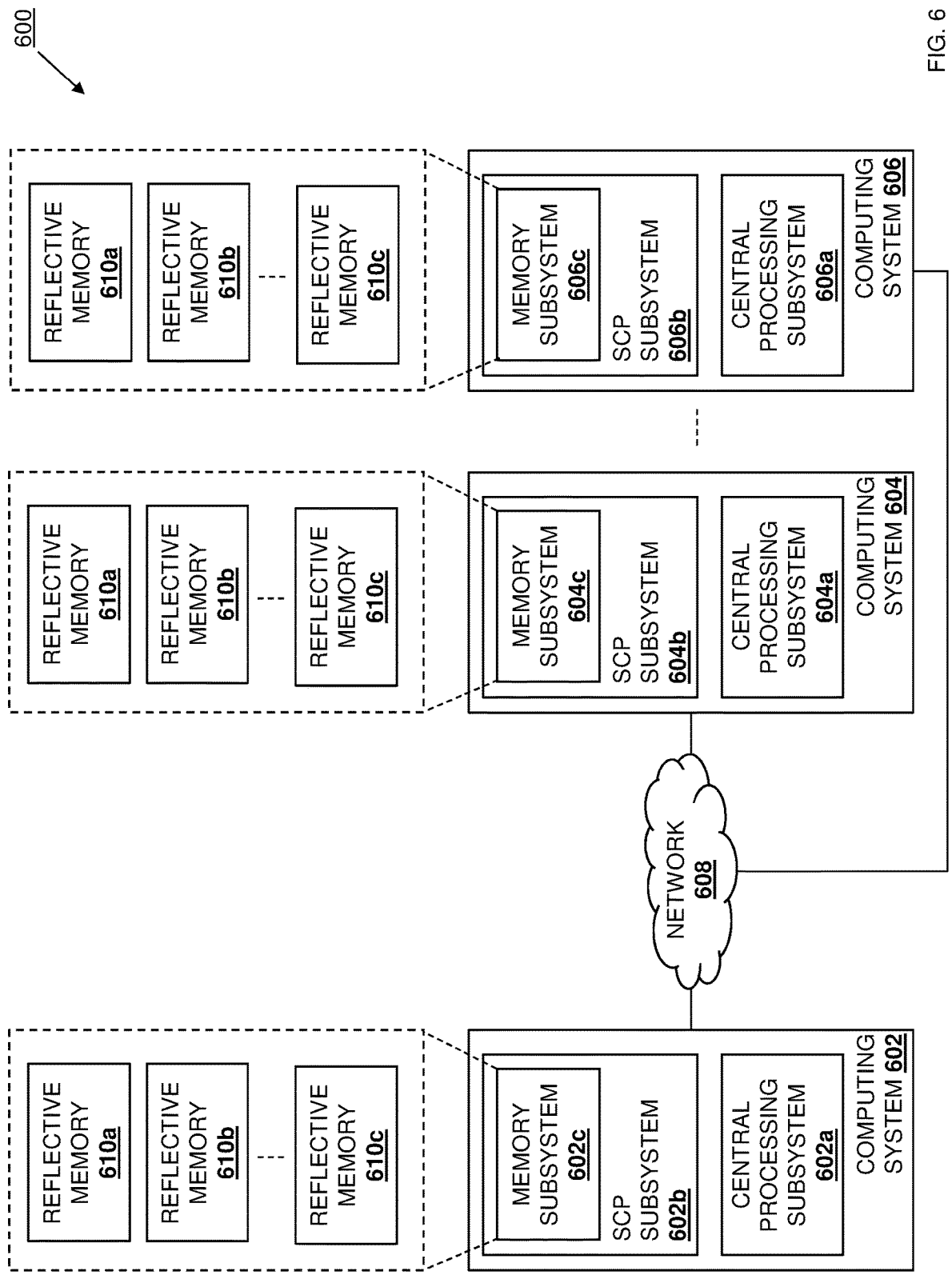

REFLECTIVE MEMORY SYSTEM

BACKGROUND

The present disclosure relates generally to information handling systems, and more particularly to providing reflective memory in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, may utilize reflective memory networks that provide a real-time, local area network in which each server device includes a local, up-to-date copy of shared data on its memory subsystem. As will be appreciated by one of skill in the art, reflective memory networks provide relatively highly deterministic data communications that deliver relatively tightly timed performance required for financial trading systems, distributed control systems, simulation systems, and/or other reflective memory systems known in the art that deterministically share common data between independent systems. For example, the highly deterministic data communications provided in reflective memory networks may be required to meet Service Level Agreements (SLAs) that provide synchronized data in the memory subsystems in different server devices in no more than one millisecond (e.g., in order to ensure applications and/or other software on different server devices can access the same data).

However, reflective memory systems require proprietary solutions to enable network accessible memory spaces via an Ethernet network, with those proprietary solutions requiring the utilization of relatively cumbersome remote memory access software stacks (e.g., middleware, libraries, sockets, etc.) that are executed by the processing system in each server device in order to generate remote memory access communications, which raises some issues. For example, the remote memory access software stacks discussed above may be executed by processing systems to generate remote memory access communications that utilize an Application Programming Interface (API) mechanism with the middleware/libraries/sockets discussed above to provide for the accessing of remote memory subsystems (e.g., by allowing the processing system to call function(s) to write to remote memory address(es), and the performing of those function(s) to program a network controller in a networking device (e.g., a Network Interface Controller (NIC) device) to perform remote memory access communications that result in remote memory write operations at those remote memory addresses.).

As will be appreciated by one of skill in the art, the remote memory subsystem write operations discussed above are not "true" memory reference operations (i.e., memory pointer access techniques/native memory semantics utilized by a processing system) like local memory subsystem write operations that utilize pointers that point to an address in a local memory subsystem that will be written to. Furthermore, the networking devices that couple their server devices to the network are connected to components in that server device via a Peripheral Component Interconnect express (PCIe) bus and "behind" an Input/Output Memory Management Unit (I/O MMU), thus preventing "pure" MMU memory access, and requiring the remote memory access software stack discussed above. As will be appreciated by one of skill in the art in possession of the present disclosure, such proprietary solutions prevent application programmers from configuring an application to utilize a shared memory pool of local and remote memory subsystems using memory pointer access techniques/native memory semantics, and instead require the programming or integration with the remote memory subsystem software stacks discussed above to generate remote memory access communications from function calls, resulting in higher cost reflective memory systems that are difficult to scale.

Accordingly, it would be desirable to provide a reflective memory system that addresses the issues discussed above.

SUMMARY

According to one embodiment, an Information Handling System (IHS) may include a secondary processing subsystem; and a secondary memory subsystem that is coupled to the secondary processing subsystem and that includes instructions that, when executed by the secondary processing subsystem, cause the secondary processing subsystem to provide a reflective memory management engine that is configured to: receive, from a central processing subsystem, a processor memory-centric reflective write request associated with a local reflective memory write operation and at least one remote reflective memory write operation; perform the local reflective memory write operation to write data to a first memory subsystem coupled to the secondary processing subsystem; generate, using remote memory access hardware included in the secondary processing subsystem, remote memory write information for performing the at least one remote reflective memory write operation to write the data at a second memory subsystem included in each at least one second computing system that is coupled to the secondary processing subsystem via a network; and instruct a networking device that couples the secondary processing subsystem to the network to utilize the remote memory write information to perform the at least one remote reflective memory write operation to write the data at the second memory subsystem included in each at least one second computing system to cause the networking device to transmit at least one first memory access communication that provides for the performance of the at least one remote reflective memory write operation to write the data at the second memory subsystem included in each at least one second computing system.

BRIEF DESCRIPTION OF THE DRAWINGS

FIG. 5 is a flow chart illustrating an embodiment of a method for providing reflective memory.

FIG. 6 is a schematic view illustrating an embodiment of a reflective memory system 600.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
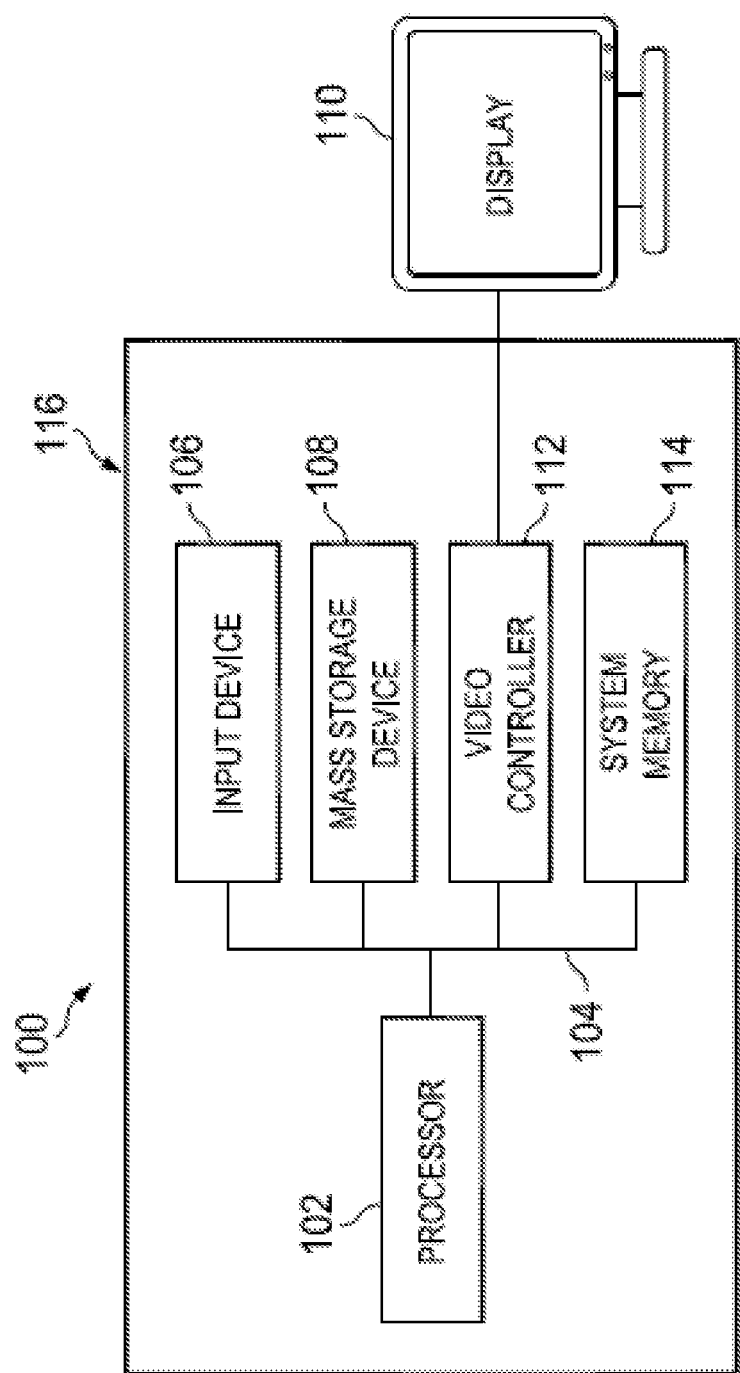
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
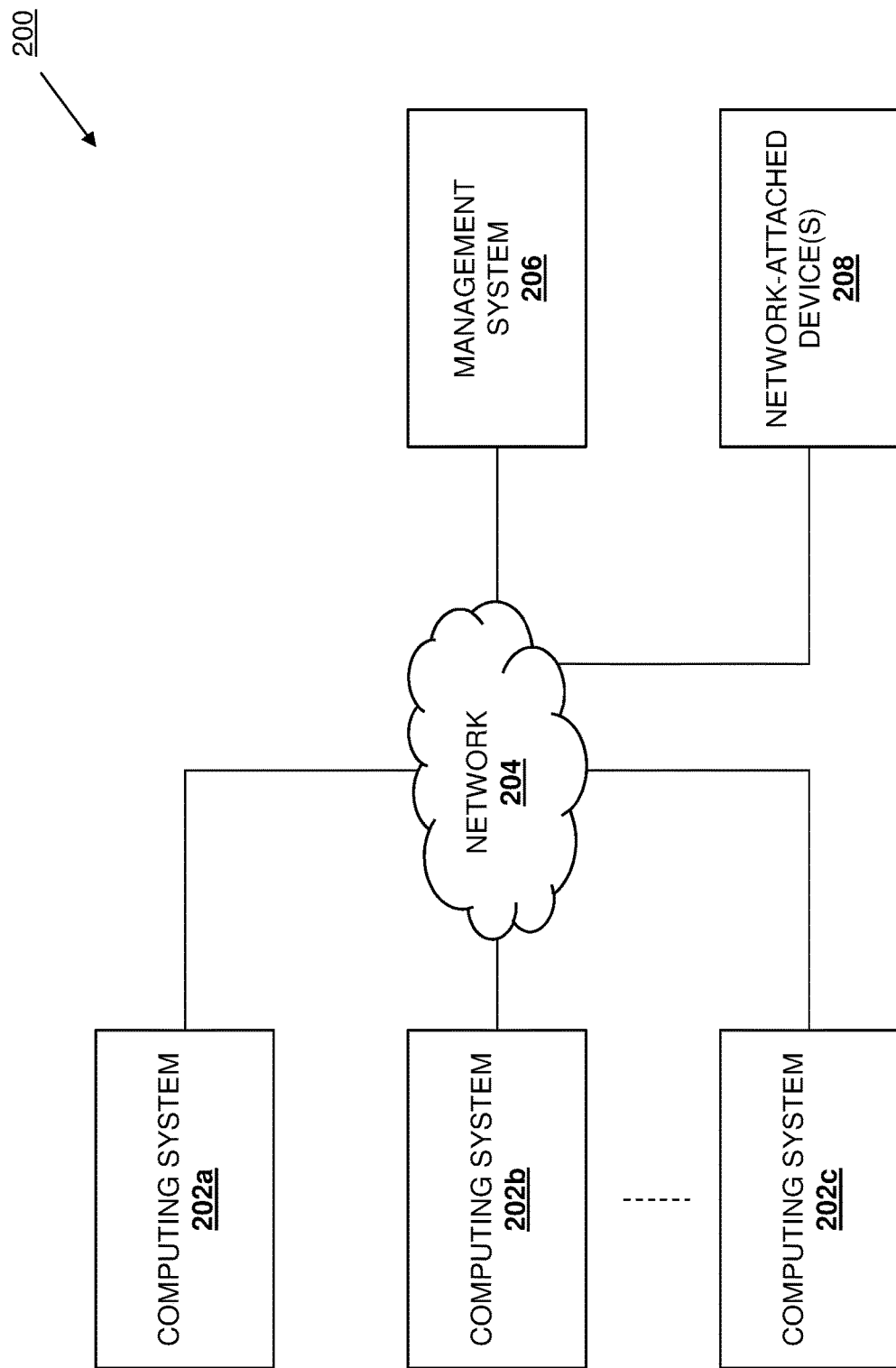
FIG. 2 is a schematic view illustrating an embodiment of a networked system.

Referring now to FIG. 2, an embodiment of a networked system 200 is illustrated in which the reflective memory system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c and/or the SCP subsystems in those computing systems (e.g., an SCP manager for the SCP subsystems discussed in further detail below). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the reflective memory system of the present disclosure may be utilized with a variety of components and component configurations, and/or may be provided in a variety of computing system/network configurations, while remaining within the scope of the present disclosure as well.

Figure 3:
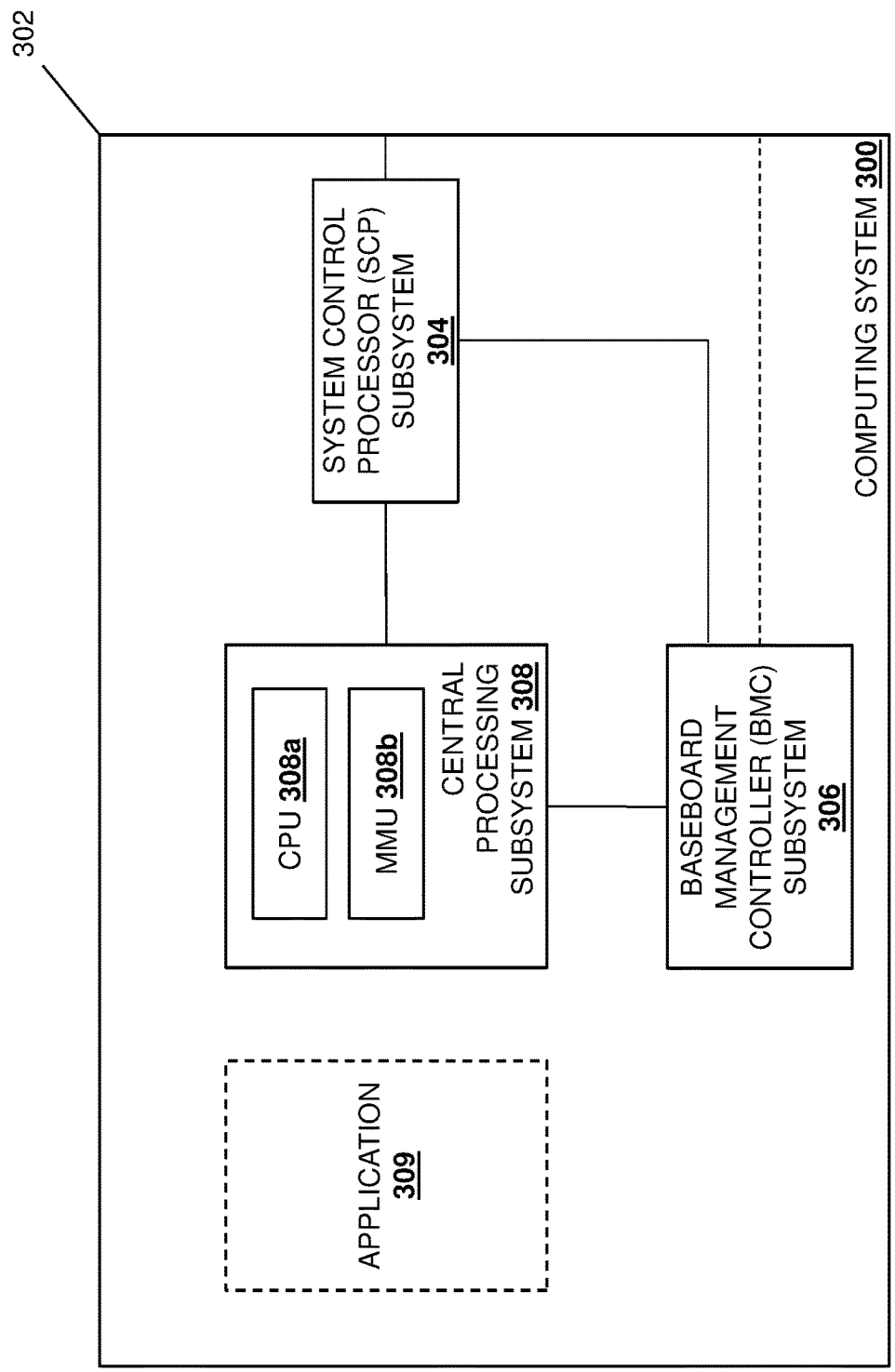
FIG. 3 is a schematic view illustrating an embodiment of a computing system that may be included in the networked system of FIG. 2 and that may utilize the reflective memory functionality of the present disclosure.

Referring now to FIG. 3, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated and discussed below.

For example, the chassis 302 may house a reflective memory management subsystem that, in the embodiments illustrated and discussed below, may be provided by a System Control Processor (SCP) subsystem 304 that is provided according to the teachings of the present disclosure to perform the reflective memory management functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and the secure communication functionality described by the inventors of the present disclosure in U.S. patent application Ser. No. 17/079,737, filed on Oct. 26, 2020, the disclosures of which is incorporated herein by reference in their entirety. However, while the reflective memory management subsystem that enables the reflective memory management functionality according to the teachings of the present disclosure is illustrated and described as an enhanced SmartNIC device provided by an SCP subsystem, one of skill in the art in possession of the present disclosure will appreciated that the reflective memory management functionality described herein may be enabled on other devices while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

In an embodiment, the chassis 302 may also house the Baseboard Management Controller (BMC) subsystem 306 that is coupled to the SCP subsystem 304, and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. As such, the BMC subsystem 310 may be configured to utilize a dedicated management network connection (e.g., illustrated by the dashed line in FIG. 3), or may be configured to utilize a network connection included in the SCP subsystem 304 (e.g., via a Network Communications Services Interface (NCSI) that allows the use of a NIC port on a NIC device in the SCP subsystem 304).

The chassis 302 may also house a central processing system 308 that is coupled to the SCP subsystem 304 and the BMC subsystem 306, and which may include one or more Central Processing Units (CPUs) 308a (e.g., an x86 host processor provided by the processor 102 discussed above with reference to FIG. 1), a Memory Management Unit (MMU) 308b, dedicated memory subsystems, and/or other central processing subsystem components that would be apparent to one of skill in the art in possession of the present disclosure. As discussed below, the dedicated memory subsystems in the central processing subsystem 308 may include instructions that, when executed by the CPU(s) 308a in the central processing subsystem 308, cause the CPU(s) 308a to provide one or more applications 309 (e.g., an operating system, applications provided via an operating system, and/or other applications known in the art) that are configured to utilize the reflective memory system as discussed below. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, in some embodiments, the BMC subsystem 306 described above with reference to FIG. 3 may be omitted, and the SCP subsystem 304 may be configured to provide a BMC subsystem that performs the functionality of the BMC subsystem 306 in FIG. 3.

Figure 4:
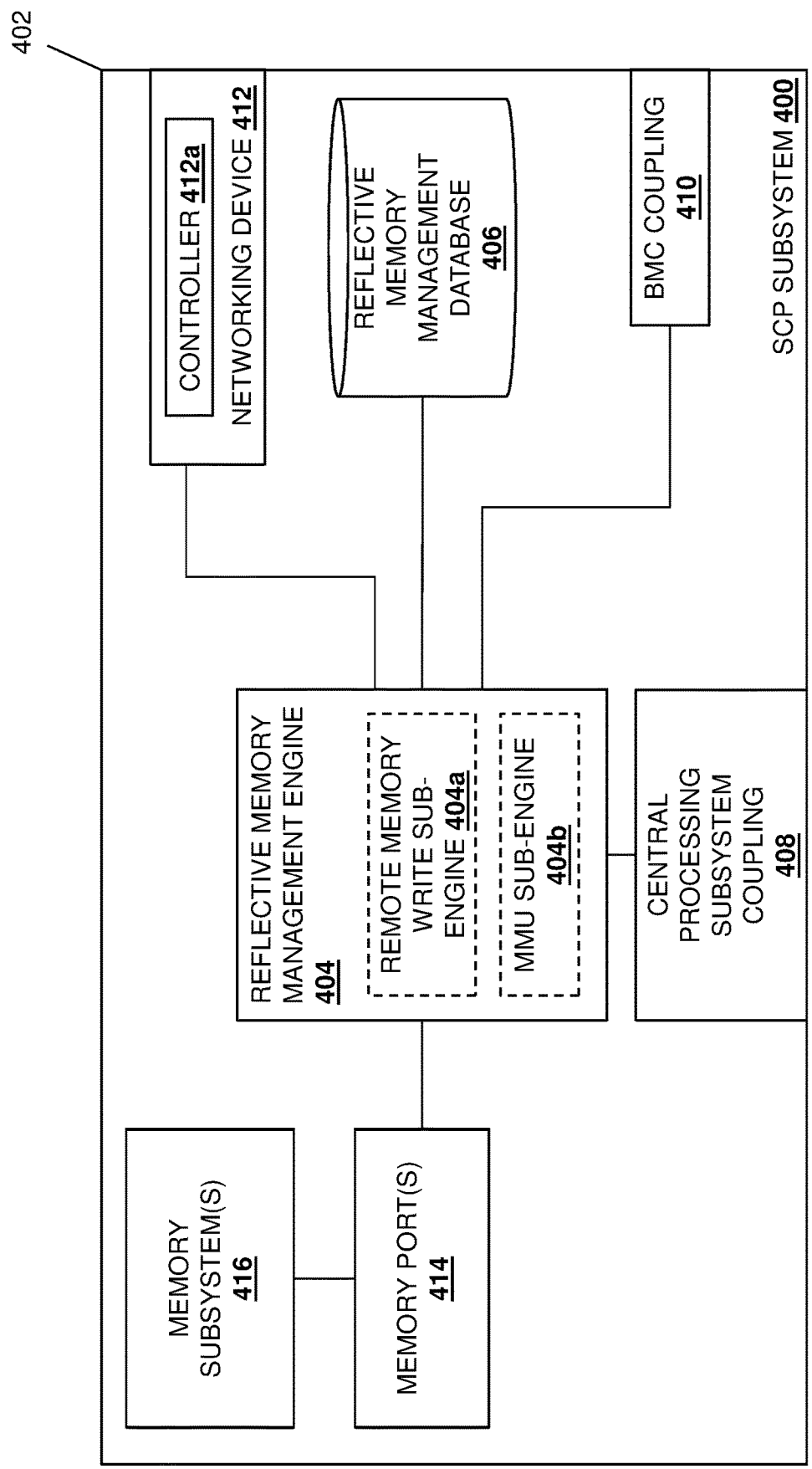
FIG. 4 is a schematic view illustrating an embodiment of a System Control Processor (SCP) subsystem that may be included in the computing system of FIG. 3 and that may provide the reflective memory functionality of the present disclosure.

With reference to FIG. 4, an embodiment of an SCP subsystem 400 is illustrated that may provide the SCP subsystem 304 discussed above with reference to FIG. 3. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, and/or may be provided as a separate/co-motherboard circuit board. However, while illustrated and discussed as being provided in different manners in a computing system 300, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 402 may support a secondary processing subsystem (which may be distinguished from the central processing subsystem 308 in the computing system 300 discussed herein) such as a networking/management processing subsystem (e.g., an SCP processing subsystem) including one or more networking/management processors (not illustrated, but which may include the processor 102 discussed above with reference to FIG. 1), and a secondary memory subsystem such as a networking/management memory subsystem (e.g., an SCP memory subsystem, not illustrated, but which may include the memory 114 discussed above with reference to FIG. 1) that is coupled to the secondary processing system and that includes instructions that, when executed by the secondary processing system, cause the secondary processing system to provide a reflective memory management engine 404 that is configured to perform the functionality of the reflective memory management engines and/or SCP subsystems discussed below.

In the illustrated embodiments, the reflective memory management engine 404 may include a remote memory write sub-engine 404a that may be provided by a hardware subsystem (e.g., a hardware accelerator device such as a high-speed state machine) that may be part of (or coupled to) the secondary processing/memory subsystems, and that is configured (e.g., a dedicated hardware accelerator device) or configurable (e.g., a Field Programmable Gate Array (FPGA) device) to perform the remote memory access operations described in further detail below. Furthermore, the reflective memory management engine 404 may also include an MMU sub-engine 404b that may be provided by a hardware subsystem (e.g., a hardware accelerator device) that may be part of (or coupled to) the secondary processing/ memory subsystems, and that is configured (e.g., a dedicated hardware accelerator device) or configurable (e.g., a Field Programmable Gate Array (FPGA) device) to perform the MMU operations described in further detail below. As will be appreciated by one of skill in the art in possession of the present disclosure, the hardware subsystems that provide the remote memory write sub-engine 404a and the MMU sub-engine 404b may provide for relative high speed, dedicated remote memory write operations and MMU operations, respectively, relative to conventional, proprietary reflective memory systems in which such functionality is enabled via a software stack executed by the x86 host processor.

In the illustrated embodiment, the chassis 402 may also support a central processing subsystem coupling 408 that may be connected to the central processing subsystem 308 in the computing system 300, and that may include the one or more Compute Express Link (CxL) root .mem/.cache Base Address Register (BAR) windows discussed below, and/or other central processing subsystem coupling components that would be apparent to one of skill in the art in possession of the present disclosure. The chassis 402 may also support a storage system (not illustrated, but which may include the storage 108 discussed above with reference to FIG. 1, a Static Random Access Memory (SRAM), etc.) that is coupled to the reflective memory management engine 404 (e.g., via a coupling between the storage system and the secondary processing subsystem) and that may include a reflective memory management database 406 that is configured to store any of the information utilized by the reflective memory management engine 404 discussed below.

The chassis 402 may also support a BMC coupling 410 such as, for example, an Out-Of-Band (00B) management coupling that is connected to the reflective memory management engine 404 (e.g., via a coupling between the BMC coupling 410 and the secondary processing subsystem) and configured to connect to the BMC subsystem 306 discussed above with reference to FIG. 3. The chassis 402 may also support a networking device 412 (e.g., a Network Interface Controller (NIC) device) that is coupled to the reflective memory management engine 404 (e.g., via a coupling between the networking system 412 and the secondary processing subsystem), that includes a controller 412a (e.g., an Ethernet controller), and that may connect the SCP subsystem 304/400 to the network 204 discussed above with reference to FIG. 2. As will be appreciated by one of skill in the art in possession of the present disclosure, the networking device 412 may also include wireless communication systems (e.g., BLUETOOTH®, Near Field Communication (NFC) components, WiFi components, etc.), component connections to computing system components (e.g., the central processing subsystem 308) in the computing system 300, and/or any other communication components that would be apparent to one of skill in the art in possession of the present disclosure.

The chassis 402 may also support one or more memory subsystems 416 that are coupled to the reflective memory management engine 404 via one or more memory port(s) 414 (e.g., CxL "host" ports) that are connected to the reflective memory management engine 404 (e.g., via a coupling between the memory port(s) 414 and the secondary processing subsystem). For example, any of the memory subsystems 416 may be provided by SCM devices (e.g., "SCP" SCM devices), DDR memory devices (e.g., "SCP" DDR memory devices), and/or any other memory subsystems/devices/technology that would be apparent to one of skill in the art in possession of the present disclosure. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components and/or component configurations for providing the functionality discussed below while remaining within the scope of the present disclosure as well.

Referring now to FIG. 5, an embodiment of a method 500 for providing reflective memory is illustrated. As discussed below, the systems and methods of the present disclosure provide a reflective memory system that includes memory subsystems in different network-connected computing systems, and that utilizes hardware subsystems to receive and identify a processor memory-centric reflective write request and, in response, write data associated with that processor memory-centric reflective write request to a local memory subsystem while causing that data to be written to remote memory subsystems. For example, the reflective memory system of the present disclosure may include network-connected computing systems including respective memory subsystems. A reflective memory management subsystem in a first computing system receives a processor memory-centric reflective write request associated with a local reflective memory write operation and remote reflective memory write operations, performs the local reflective memory write operation to write data to a memory subsystem in the first computing system, and uses remote memory access hardware to generate remote memory write information for performing the remote reflective memory write operations to write the data at respective second memory subsystems in second computing systems. The reflective memory management subsystem then instructs a networking device in the first computing system to utilize the remote memory write information to transmit first memory access communications that provide for the performance of the remote reflective memory write operations to write the data at the second memory subsystem in each second computing system. As such, programmers may configure applications to utilize a shared memory pool of local and remote memory subsystems using memory pointer access techniques/native memory semantics, rather than programming or integrating with remote memory subsystem software stacks, resulting in reduced cost reflective memory systems that are relatively easier to scale.

In some embodiments, during or prior to the method 500, the SCP subsystems 304 in each computing system 202a-202c/300 may establish secure communication channels with each other. For example, each of the SCP subsystems 304 in the computing systems 202a-202c/300 may be configured to perform the secure communication functionality described by the inventors of the present disclosure in U.S. patent application Ser. No. 17/079,737, filed on Oct. 26, 2020, the disclosure of which is incorporated herein by reference in its entirety. Thus, as described in that application, the SCP subsystem 304 in the computing system 202b/300 may identify the SCP subsystem 304 in the computing system 202a/300, sign a second SCP authentication communication with a second private key, and transmit the second signed SCP authentication communication to the SCP subsystem 304 in the computing system 202a/300, while the SCP subsystem 304 in the computing system 202a/300 signs a first SCP authentication communication with a first private key, and transmits the first signed SCP authentication communication to the SCP subsystem 304 in the computing system 202b/300. The SCP subsystem 304 in the computing system 202b/300 may then authenticate the first SCP authentication communication using a first public key, the SCP subsystem 304 in the computing system 202a/300 may authenticate the second SCP authentication communication using a second public key and, in response, the SCP subsystems 304 in the computing systems 202a/300 and 202b/300 will establish a secure communication channel.

As also described in that application, the SCP subsystem 304 in the computing system 202b/300 may then identify the SCP subsystem 304 in the computing system 202c/300, sign a second SCP authentication communication with a second private key, and transmit the second signed SCP authentication communication to the SCP subsystem 304 in the computing system 202c/300, while the SCP subsystem 304 in the computing system 202c/300 signs a third SCP authentication communication with a third private key, and transmits the third signed SCP authentication communication to the SCP subsystem 304 in the computing system 202b/300. The SCP subsystem 304 in the computing system 202b/300 may then authenticate the third SCP authentication communication using a third public key, the SCP subsystem 304 in the computing system 202c/300 may authenticate the second SCP authentication communication using a second public key and, in response, the SCP subsystems 304 in the computing systems 202b/300 and 202c/300 will establish a secure communication channel.

As also described in that application, the SCP subsystem 304 in the computing system 202b/300 may then attest to the authentication of the SCP subsystem 304 in the computing system 202c/300 to the SCP subsystem 304 in the computing system 202a/300, and attest to the authentication of the SCP subsystem 304 in the computing system 202a/300 to the SCP subsystem 304 in the computing system 202c/300, which allows the SCP subsystems 304 in the computing systems 202a/300 and 202c/300 to establish a secure communication channel without transmitting signed SCP authentication communications. Furthermore, any SCP subsystem authenticated by an SCP subsystem may have its authentication attested to other SCP subsystems to quickly and securely grow the secure communication fabric between the SCP subsystems. As also described in that application, enabling keys may provide for use of the secure communication channels by each of the SCP subsystems 304 in the computing systems 202a/300, 202b/300, and 202c/300 to securely exchange communications, and continued performance of the platform root-of-trust functionality referenced above by those SCP subsystems will ensure that the secure communication channels are only maintained with trusted SCP subsystems and/or computing systems. As such, secure communication channels may be established between the SCP subsystems 304 in the computing systems 202a-202c/300 that each operate as trusted systems to perform any of the inter-SCP subsystem communications discussed below in a secure manner.

The method 500 begins at block 502 where reflective memory fabric is configured. In an embodiment, at block 502, the SCP subsystems 304/400 in the computing systems 202a-202c/300 may power on, reset, reboot, and/or otherwise initialize and, in response, the reflective memory management engine 404 in each of those SCP subsystems 304/400 may identify reflective memory subsystem information (e.g., a reflective memory map configuration, with remote memory subsystems indexed by Internet Protocol (IP) addresses of the system including that remote memory subsystem), and/or other reflective memory information known in the art, and broadcast that reflective memory subsystem information to the other SCP subsystems 304/400. As such, at block 502, the reflective memory management engine 404 in each of the SCP subsystems 304/400 in the computing systems 202a-202c/300 may receive the reflective memory subsystem information broadcast by each of the other SCP subsystems 304/400, which allows the reflective memory management engine 404 in each of the SCP subsystems 304/400 to generate a global reflective memory map, configure memory subsystem offsets, configure Base Address Register (BAR) windowing registers, and/or perform any other reflective memory subsystem information operations that one of skill in the art in possession of the present disclosure will appreciate would provide for the reflective memory functionality discussed below. In some embodiments, only "trusted" SCP subsystems with secure communications channels between each other may be configured as part of the reflective memory fabric at block 502. As will be appreciated by one of skill in the art in possession of the present disclosure, while not explicitly described above, the global reflective memory map generation may involve the management system 206 (e.g., an SCP manager) while remaining within the scope of the present disclosure as well.

With reference to FIG. 6, an embodiment of a global reflective memory map 600 is illustrated that may be generated by a reflective memory system provided according to the teachings of the present disclosure. In the illustrated example, global reflective memory map 600 is provided for three or more computing systems, with a "first" computing system 602 (e.g., the computing system 202a in the examples below) including the central processing subsystem 602a and the SCP subsystem 602b with the memory subsystem 602c, a "second" computing system 604 (e.g., the computing system 202b in the examples below) including the central processing subsystem 604a and the SCP subsystem 604b with the memory subsystem 604c, and up to an "nth" computing system 606 (e.g., the computing system 202c in the examples below) including the central processing subsystem 606a and the SCP subsystem 606b with the memory subsystem 606c. Furthermore, a network 608 (e.g., the network 204 discussed above with reference to FIG. 2) couples together the "first" computing system 602, the "second" computing system 604, and the "nth" computing system 606 via, for example, their respective SCP subsystems 602b, 604b, and up to 606b.

As such, FIG. 6 illustrates how the global reflective memory map 600 allocates portions of each of the memory subsystems 602c, 604c, and up to 606c for reflecting other memory subsystems in each of the SCP subsystems 602b, 604b, and up to 606b and/or computing systems 602, 604, and up to 606. For example, the memory subsystem 602c in the SCP subsystem 602b in the computing system 602 includes a portion allocated to reflective memory 610a that is "local" from the perspective of the SCP subsystem 602b/computing system 602, a portion allocated to reflective memory 610b that is "reflected" from the SCP subsystem 604b/computing system 604, and up to a portion allocated to reflective memory 610c that is "reflected" from the SCP subsystem 606b/computing system 606. Similarly, the memory subsystem 604c in the SCP subsystem 604b in the computing system 604 includes a portion allocated to reflective memory 610a that is "reflected" from the SCP subsystem 602b/computing system 602, a portion allocated to reflective memory 610b that is "local" from the perspective of the SCP subsystem 604b/computing system 604, and up to a portion allocated to reflective memory 610c that is "reflected" from the SCP subsystem 606b/computing system 606.

Similarly as well, the memory subsystem 606c in the SCP subsystem 606b in the computing system 606 includes a portion allocated to reflective memory 610a that is "reflected" from the SCP subsystem 602b/computing system 602, a portion allocated to reflective memory 610b that is "reflected" from the SCP subsystem 604b/computing system 604, and up to a portion allocated to reflective memory 610c that is "local" from the perspective of the SCP subsystem 606b/computing system 606. As such, each of the memory subsystems 602c, 604c, and up to 606c in the SCP subsystems 602b, 604b, and up to 606b, respectively, in the computing systems 602, 604, and up to 606, respectively, includes a local shared copy of data that includes "local" data for that SCP subsystem/computing system, and "remote" data for the other SCP subsystems/computing systems, and one of skill in the art in possession of the present disclosure will appreciate that "local" data from the perspective of one SCP subsystem/computing system will be considered "remote" or "reflected" data from the perspective of each of the other SCP subsystems/computing systems. In some embodiments, "reflected" memory may be marked as non-cacheable in each SCP subsystem.

Furthermore, while not described in detail herein, one of skill in the art in possession of the present disclosure will appreciate how memory subsystem offsets may be configured for the memory subsystem(s) in the computing systems 602, 604, and up to 606 in order to address the use of different/inconsistent addressing information for the memory subsystems in those computing systems 602, 604, and up to 606 (e.g., a remote memory address in the memory subsystem 604c in the SCP subsystem 604b included in the computing system 604 may be defined as "address 1000" in the memory subsystem 602c in the SCP subsystem 602b in the computing system 602, while being defined as "address 2000" in the memory subsystem 604c in the SCP subsystem 604b included in the computing system 604, with the memory subsystem offsets utilized to convert a memory access request for "address 1000" by the central processing subsystem 602a in the computing system 602 to a memory access request for "address 2000" in the memory subsystem 604c in the SCP subsystem 604b included in the computing system 604).

Furthermore, while not described in detail herein, one of skill in the art in possession of the present disclosure will also appreciate how BAR windowing registers in the central processing subsystem coupling 408 may be configured at block 502 as well. As will be recognized by one of skill in the art in possession of the present disclosure, a BAR may provide the beginning of the address space assigned to a "local" SCP subsystem by its corresponding "local" central processing subsystem (e.g., an x86 host CPU), and all of the memory subsystem for local SCP subsystem, as well as remote memory subsystems, may be accessed by that central processing subsystem generating an access identified by "BAR+an offset" that identifies where the access (e.g., a read or write) is targeted. As such, configuration operations may be performed at block 502 to provide BAR windowing register functionality discussed above, as well as any other BAR windowing functionality known in the art, while remaining within the scope of the present disclosure. However, while a specific global reflective memory map is illustrated and described, one of skill in the art in possession of the present disclosure will appreciate that global reflective memory maps utilized with the reflective memory system of the present disclosure may be more complicated and/or may include different features than described above while remaining within the scope of the present disclosure as well.

Figure 7A:
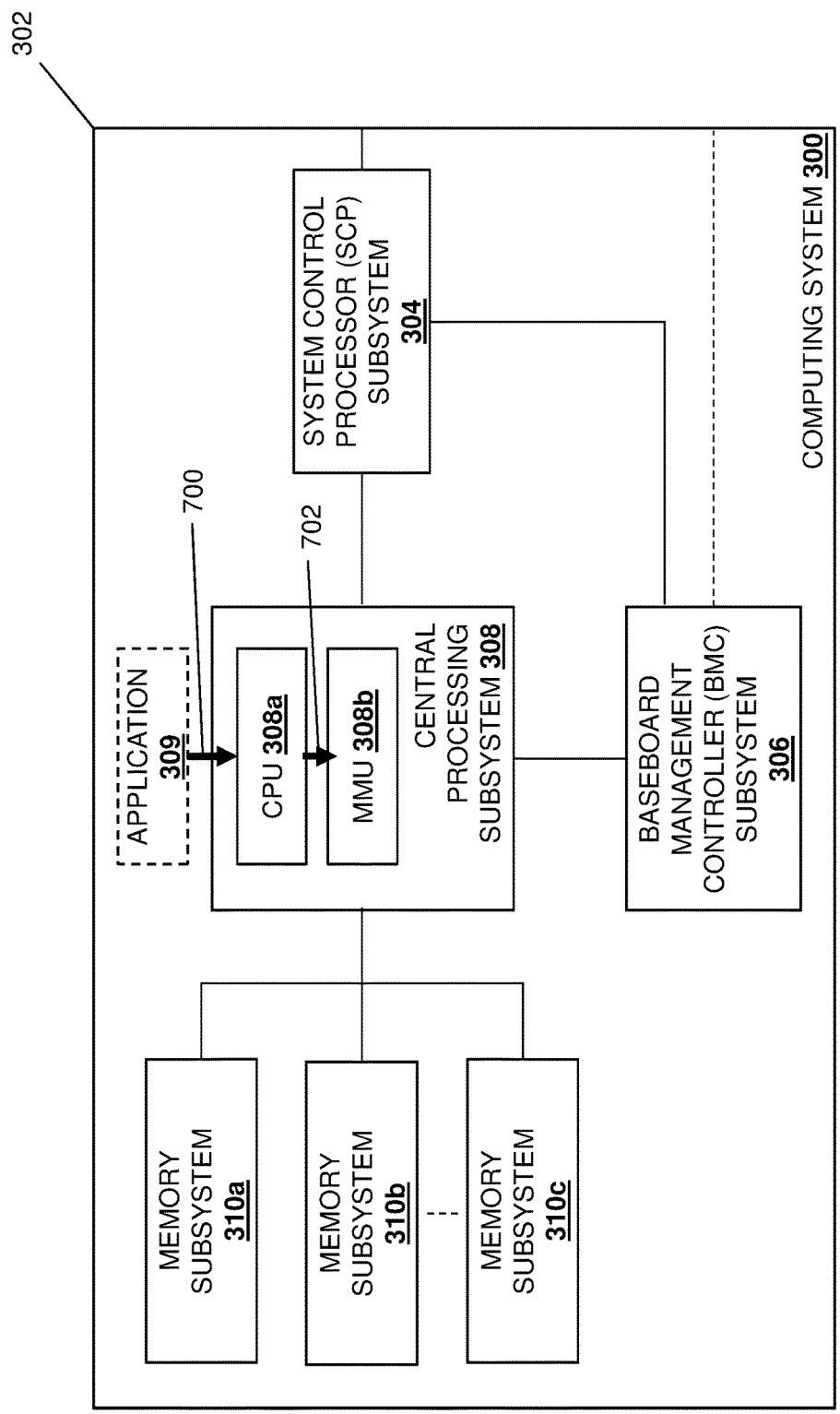
FIG. 7A is a schematic view illustrating an embodiment of the computing system of FIG. 3 operating during the method of FIG. 5.

The method 500 then proceeds to block 504 where a reflective memory management subsystem receives a processor memory-centric access request from a central processing subsystem. As illustrated in FIG. 7A, in some embodiments, the application 309 provided in the computing system 202a/300 may perform application memory access request operations 700 that may include generating and transmitting an application request to perform a memory access to the CPU 308a in the computing system 202a/300, with that application request identifying a memory read operation, a memory write operation, and/or other memory access operations known in the art, along with any other memory access operation information (e.g., data to write as part of the memory write operation, etc.) that would be apparent to one of skill in the art in possession of the present disclosure.

In response to receiving the application request to perform the memory access from the application 309, the CPU 308a in the computing system 202a/300 may perform CPU reflective memory access request operations 702 that include generating and transmitting a CPU request to perform a reflective memory access to the MMU 308b in the computing system 202a/300. In several embodiments, the CPU request to perform the reflective memory access is a processor memory-centric access request that is generated by the CPU 308a and that includes a memory subsystem address pointer (e.g., *ptr) that points to a memory address (e.g., a "local" memory address associated with the SCP subsystem 304/400 and/or the computing system 202a/300 in the reflective global memory map) at which the memory access operation requested by the application (e.g., the memory read operation, memory write operation, and/or other memory access operations) should be performed, and that may include any other reflective memory access operation information (e.g., data to write as part of a reflective memory write operation, etc.) that would be apparent to one of skill in the art in possession of the present disclosure.

As such, one of skill in the art in possession of the present disclosure will appreciate that the processor memory-centric access requests described herein utilize the native protocol of the central processing subsystem (e.g., a CPU) to perform CPU load operations, and CPU store operations. For example, one of skill in the art in possession of the present disclosure will recognize that the generation of an Ethernet packet may require a CPU to perform thousands of load/store operations in order to program an Ethernet controller and create an Ethernet descriptor that allows the Ethernet controller to send and/or receive data packet. Furthermore, one of skill in the art in possession of the present disclosure will also recognize that CPUs utilize processor memory-centric access requests (e.g., native load/store instructions) to communicate with Dynamic Random Access Memory (DRAM), and load/store operations an conventionally mapped to native CPU instructions, while Ethernet send/receive operations are not conventionally mapped to native CPU instructions. However, while a specific CPU-memory-access request is described, one of skill in the art in possession of the present disclosure will appreciate that the CPU 308a may utilize other memory pointer access techniques/native memory semantics to provide the CPU request to perform the memory access while remaining within the scope of the present disclosure as well.

As will be appreciated by one of skill in the art in possession of the present disclosure, in response to receiving the CPU request to perform the reflective memory access from the CPU 308a, the MMU 308b in the computing system 202a/300 may reference a reflective global memory map (e.g., the reflective global memory map 600 discussed above) to determine that that the CPU request to perform the reflective memory access is directed to a SCP subsystem/computing system "local" memory subsystem (e.g., using the example of the reflective global memory map 600 above, the processor memory-centric access request points to a memory address included in the reflective memory 610a that is "local" from the perspective of the SCP subsystem 602b/computing system 602).

Figure 7B:
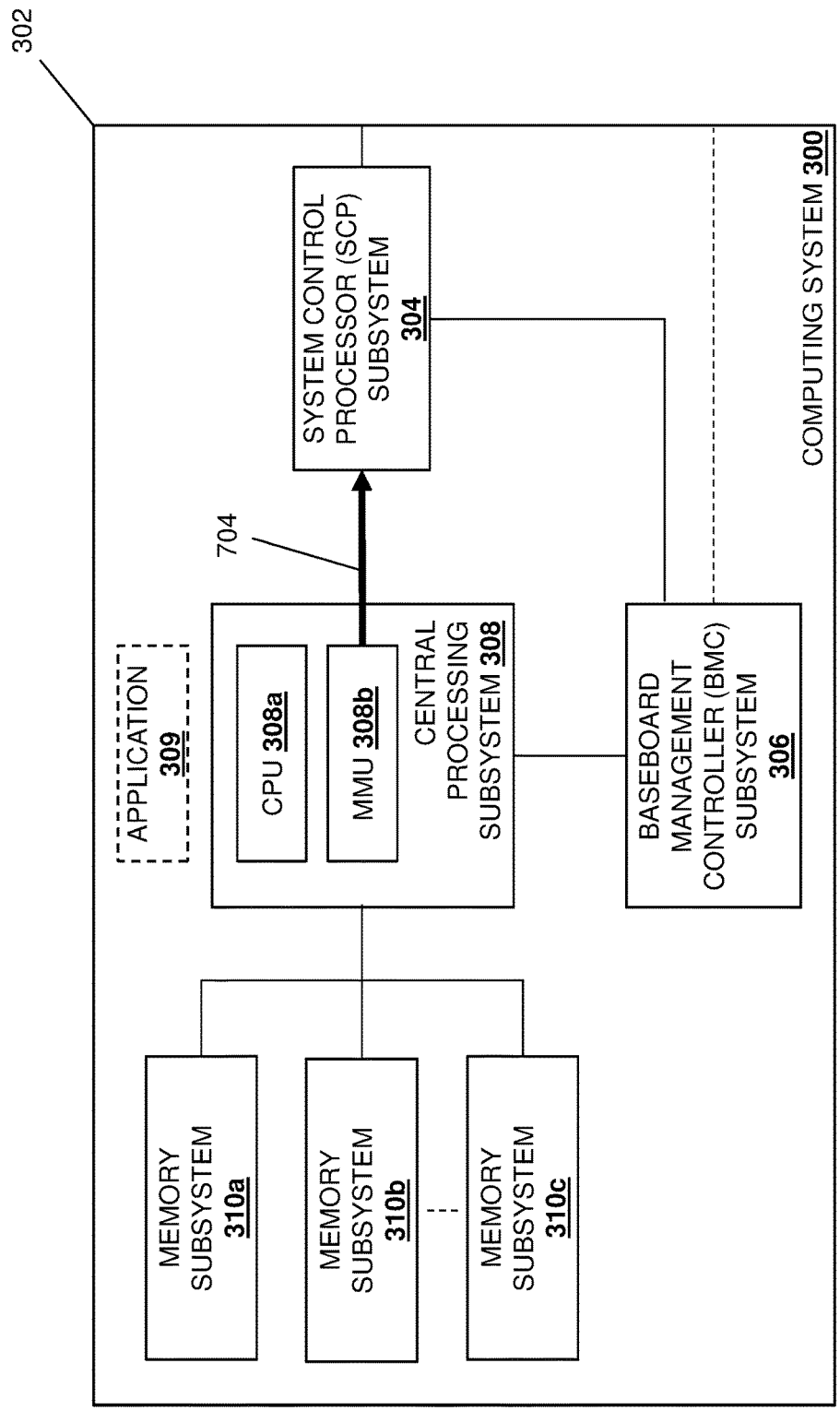
FIG. 7B is a schematic view illustrating an embodiment of the computing system of FIG. 3 operating during the method of FIG. 5.

With reference to FIG. 7B, in response to the MMU 308a in the central processing subsystem 308 in the computing system 202a/300 determining that the CPU request to perform the reflective memory access is directed to SCP subsystem/computing system "local" memory subsystem (e.g., using the example of the reflective global memory map 600 above, the processor memory-centric access request points to a memory address included in the reflective memory 610a that is "local" from the perspective of the SCP subsystem 602b/computing system 602), the MMU 308b in the central processing subsystem 308 in the computing system 202a/300 may perform CPU reflective memory request forwarding operations 704 to forward the CPU request to perform the reflective memory access to the SCP subsystem 304 in the computing system 202a/300.

Figure 7C:
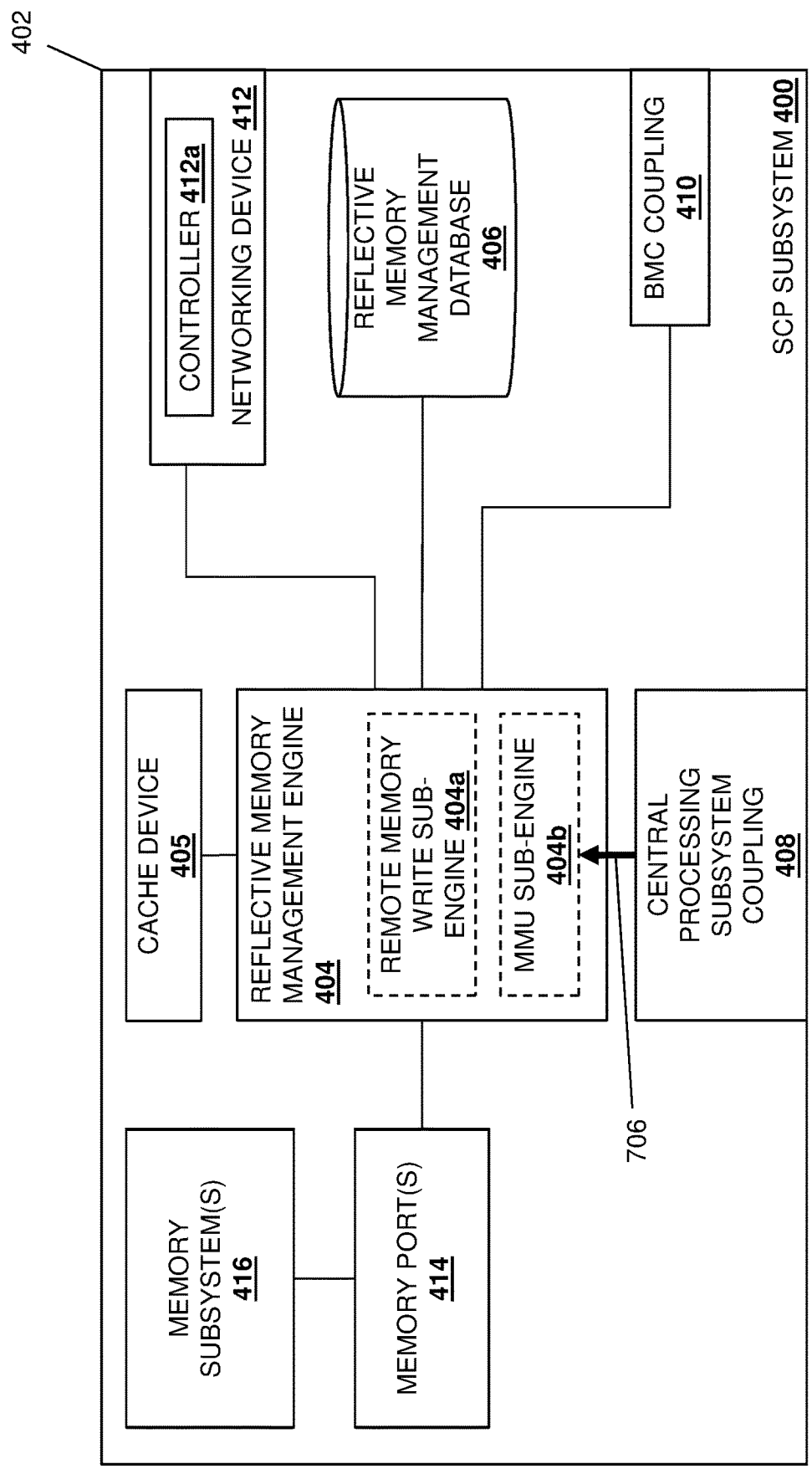
FIG. 7C is a schematic view illustrating an embodiment of the computing system of FIG. 3 operating during the method of FIG. 5.

As such, with reference to FIG. 7C and in an embodiment of block 504, the MMU sub-engine 404b in the reflective memory management engine 404 that is provided by the hardware subsystem and included in the SCP subsystem 304/400 in the computing system 202a/300 may perform reflective memory access request receiving operations 706 that include receiving the CPU request to perform the reflective memory access (e.g., the processor memory-centric access request) via the central processing subsystem coupling 408 and from the MMU 308a in the central processing subsystem 308 in the computing system 202a/300. In a specific example, the CPU request to perform the reflective memory access (e.g., the processor memory-centric access request) may be transmitted by the MMU 308a in the central processing subsystem 308 in the computing system 202a/300 via a CxL port on that central processing subsystem 308, and received by the MMU sub-engine 404b in reflective memory management engine 404 of the SCP subsystem 304/400 in the computing system 202a/300 via CxL root .mem/.cache BAR windows provided by the central processing subsystem coupling 408 (e.g., in-bound memory windows associated with global reflective memory address space). However, while specific subsystems for receiving the processor memory-centric access request at the reflective memory management subsystem are described, one of skill in the art in possession of the present disclosure will appreciate that other subsystems/techniques will fall within the scope of the present disclosure as well.

The method 500 then proceeds to decision block 506 where it is determined whether the processor memory-centric access request provides a reflective memory read access or a reflective memory write access. In an embodiment, at decision block 506 and in response to receiving the CPU request to perform the reflective memory access from the CPU 308a (e.g., the processor memory-centric access request), the MMU sub-engine 404b in the reflective memory management engine 404 that is provided by the hardware subsystem and included in the SCP subsystem 304/400 in the computing system 202a/300 may reference a reflective global memory map (e.g., the reflective global memory map 600 discussed above) to determine that the CPU request to perform the reflective memory access is directed to the SCP subsystem/computing system "local" memory subsystem (e.g., using the example of the reflective global memory map 600 above, the processor memory-centric access request points to a memory address included in the reflective memory 610a that is "local" from the perspective of the SCP subsystem 602b/computing system 602) and, in response, determine whether that reflective memory access is a reflective memory read access or a reflective memory write access.

Figure 7D:
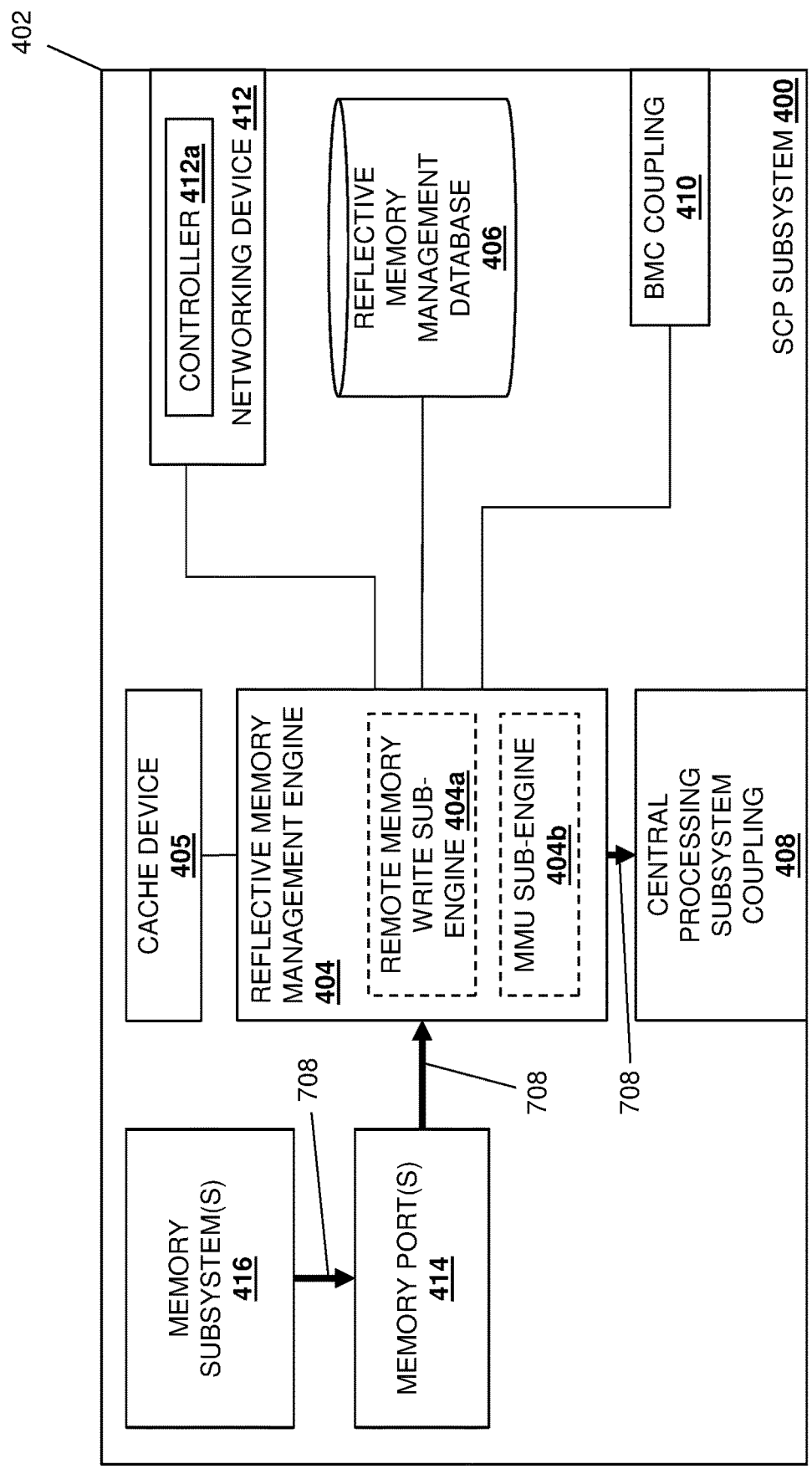
FIG. 7D is a schematic view illustrating an embodiment of the SCP subsystem of FIG. 4 operating during the method of FIG. 5.

If, at decision block 506, it is determined that the processor memory-centric access request provides a reflective memory read access, the method 500 proceeds to block 508 where the reflective memory management subsystem performs local reflective memory read operations. With reference to FIG. 7D, in an embodiment of decision block 506 the MMU sub-engine 404b in the reflective memory management engine 404 that is provided by the hardware subsystem and included in the SCP subsystem 304/400 in the computing system 202a/300 may determine that the CPU request to perform the reflective memory access provides a reflective memory read access and, in response, the reflective memory management engine 404 in the SCP subsystem 304/400 in the computing system 202a/300 may perform the reflective memory read operation 708 specified in that CPU request via the memory port(s) 414 (e.g., CxL host ports) and on the memory subsystem(s) 416 in the SCP subsystem 304/400 in the computing system 202a/300, which may include reading the data specified in that reflective memory read request (e.g., from the memory address included in the reflective memory 610a that is "local" from the perspective of the SCP subsystem 602b/computing system 602), and transmitting that data via the central processing subsystem coupling 408 to the central processing subsystem 308 for provisioning to the application 309 (thus completing the application request received at block 504).

Figure 7E:
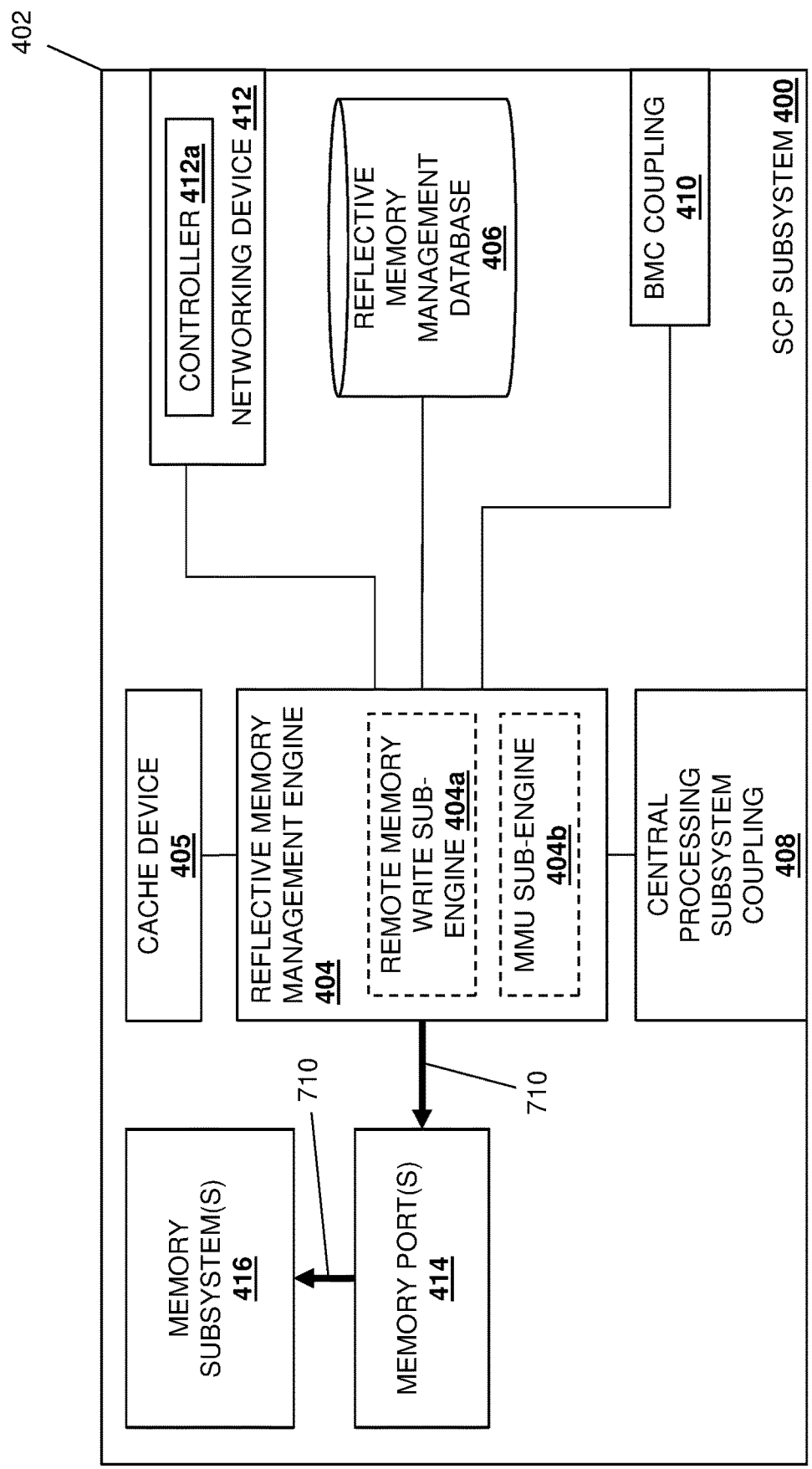
FIG. 7E is a schematic view illustrating an embodiment of the SCP subsystem of FIG. 4 operating during the method of FIG. 5.

If, at decision block 506, it is determined that the processor memory-centric access request provides a reflective memory write access, the method 500 then proceeds to block 509 where the reflective memory management subsystem performs local reflective memory write operations. With reference to FIG. 7E, in an embodiment of decision block 506 the MMU sub-engine 404b in the reflective memory management engine 404 that is provided by the hardware subsystem and included in the SCP subsystem 304/400 in the computing system 202a/300 may determine that the CPU request to perform the reflective memory access provides a reflective memory write access and, in response, the reflective memory management engine 404 in the SCP subsystem 304/400 in the computing system 202a/300 may perform local reflective memory write operations 710 specified in that CPU request via the memory port(s) 414 (e.g., CxL host ports) and on the memory subsystem(s) 416 in the SCP subsystem 304/400 in the computing system 202a/300, which may include writing the data specified in that reflective memory write request (e.g., to the memory address included in the reflective memory 610a that is "local" from the perspective of the SCP subsystem 602b/computing system 602). As will be appreciated by one of skill in the art in possession of the present disclosure, local reflective memory write operations on the memory subsystem in any SCP subsystem included in a computing system may be restricted such that they can only be performed by that SCP subsystem.

As discussed in further detail below with regard to optional block 516, in some embodiments, the reflective memory management engine 404 in the SCP subsystem 304/400 in the computing system 202a/300 may act as a remote reflective memory write operation acknowledgement/completion status collector to identify whether a plurality of remote reflective memory write operations have been ackowleged/completed in the memory subsystems included in the SCP subsystems 304/400 in the computing systems 202b and up to 202c and, in response, provide a completion status to the application 309 via the central processing subsystem 308 in the computing system 202a/300. However, in the event remote reflective memory write operation acknowledgement/completion status collection is not performed during the method 500, the local reflective memory write operation performed at block 508 may be an asynchronous operation that completes the processor memory-centric access request received from the central processing subsystem 308 in the computing system 202a/300 without the need for acknowledgements or completion status reporting.

Figure 7F:
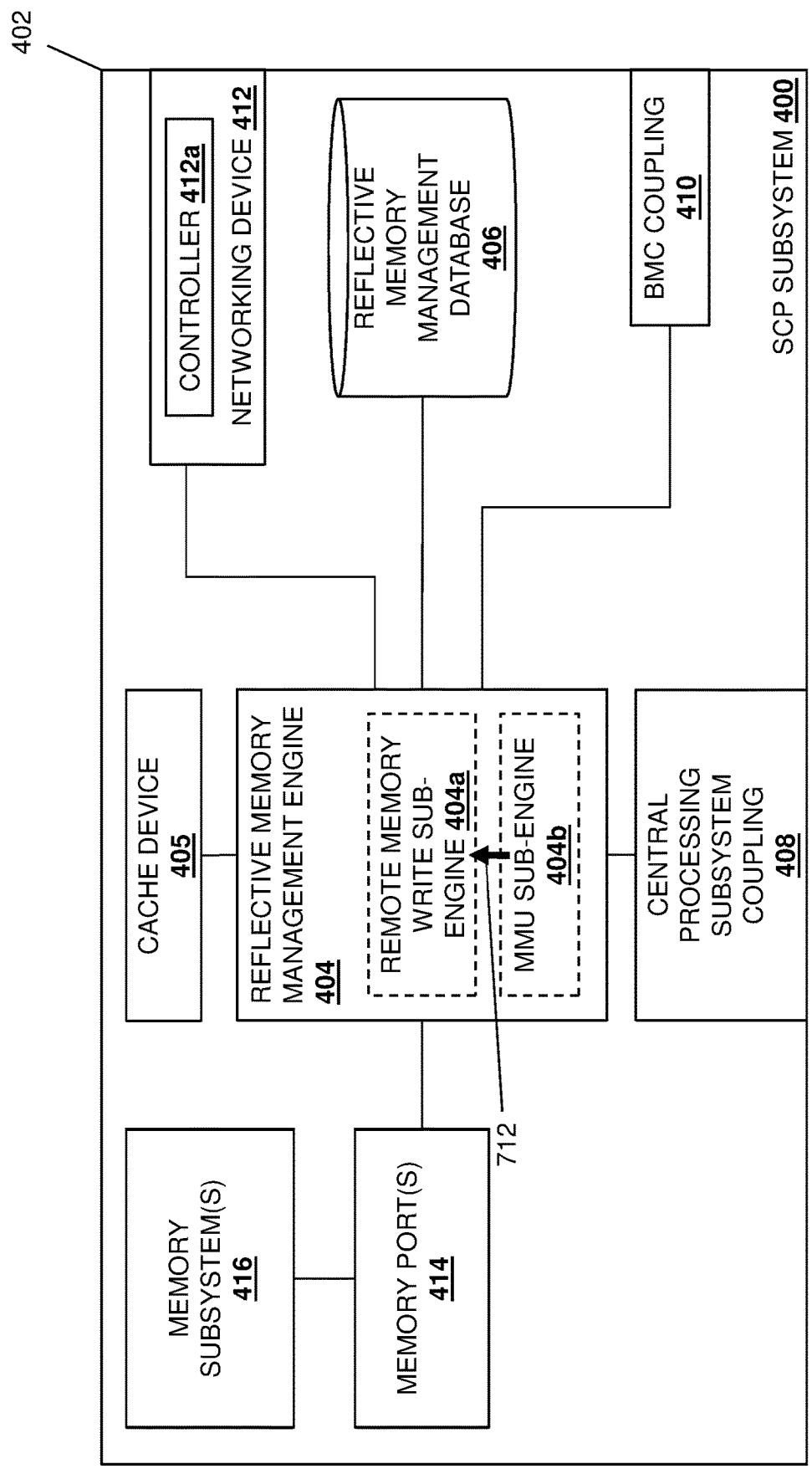
FIG. 7F is a schematic view illustrating an embodiment of the SCP subsystem of FIG. 4 operating during the method of FIG. 5.

The method 500 then proceeds to block 510 where the reflective memory management subsystem generates remote reflective memory write information for performing remote reflective memory write operation(s). As will be appreciated by one of skill in the art in possession of the present disclosure, a local reflective memory write operation that writes data to reflective memory that is "local" from the perspective of an SCP subsystem/computing system may require subsequent remote reflective memory write operations to write that data to reflective memory that is "remote" from the perspective of that SCP subsystem/computing system in order to "reflect" that data on other SCP subsystems/computing systems. As such, with reference to FIG. 7F and following the local reflective memory write operation, the MMU sub-engine 404b in the clustered memory management engine 404 that is provided by the hardware subsystem and included in the SCP subsystem 304/400 in the computing system 202a/300 may perform remote reflective memory write request transmission operations 712 to transmit the CPU request to perform the reflective memory write (e.g., the processor memory-centric access request) to the remote memory write sub-engine 404a in the reflective memory management engine 404 that is provided by the hardware subsystem (e.g., a high speed state machine) included in the SCP subsystem 304/400 in the computing system 202a/300.

Figure 7G:
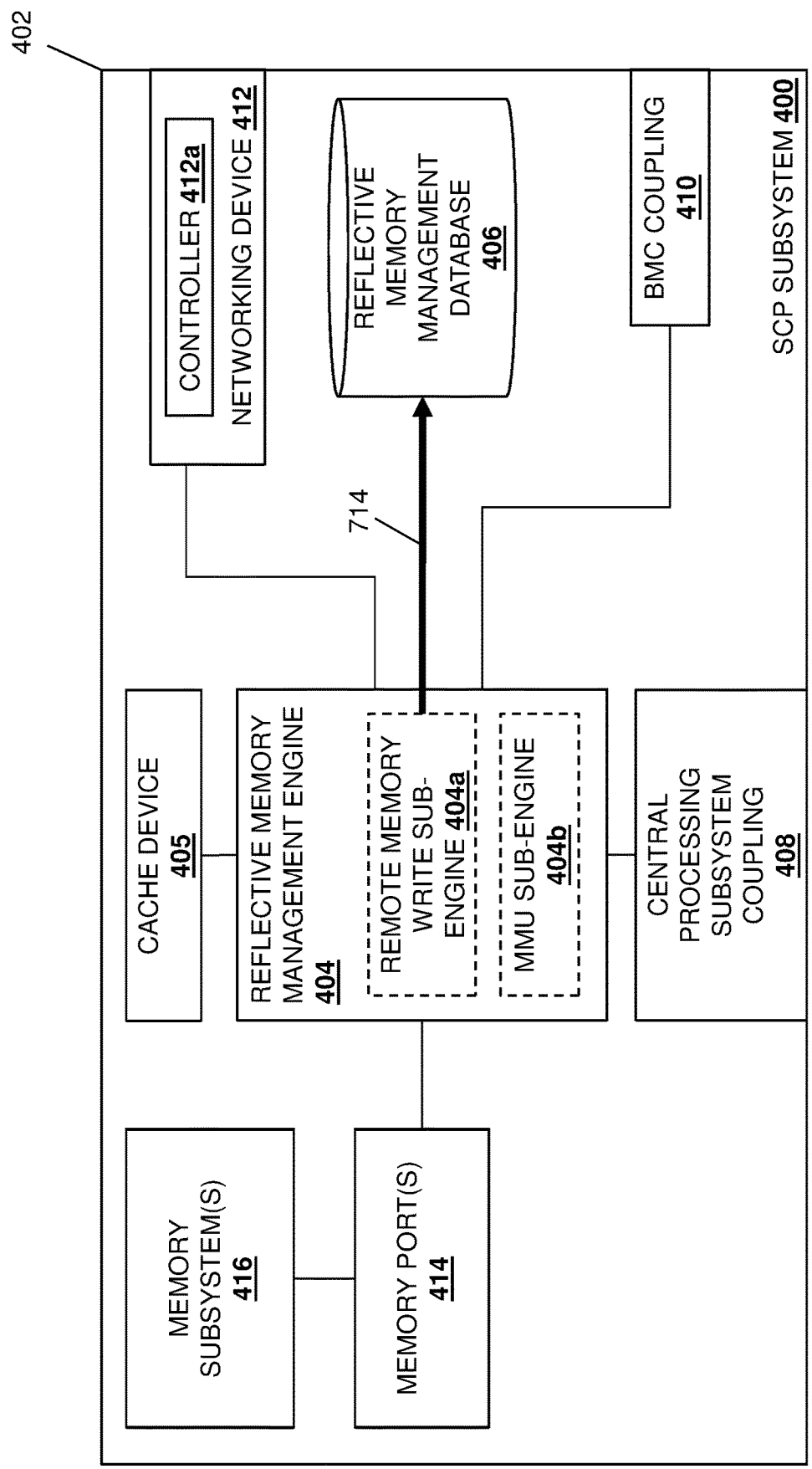
FIG. 7G is a schematic view illustrating an embodiment of the SCP subsystem of FIG. 4 operating during the method of FIG. 5.

With reference to FIG. 7G, in response to receiving the CPU request to perform the reflective memory write (e.g., the processor memory-centric access request), the remote memory write sub-engine 404a in the reflective memory management engine 404 that is provided by the hardware subsystem and included in the SCP subsystem 304/400 in the computing system 202a/300 may perform remote reflective memory write generation operations 714 to generate remote reflective memory write information for performing remote reflective memory write operations, and store that remote reflective memory write information in the reflective memory management database 406 (e.g., provided by SRAM device(s)). For example, the remote reflective memory write generation operations 714 may include the use of any information included in the CPU request to perform the reflective memory write (e.g., the processor memory-centric access request) in order to generate an Ethernet descriptor for the controller 412a (e.g., an Ethernet controller) in the networking device 412 that identifies remote reflective memory address information, remote reflective memory write operations, and/or any other remote reflective memory write information that one of skill in the art in possession of the present disclosure would recognize as allowing for the remote reflective memory write operations discussed below.

In a specific example, the remote reflective memory write generation operations 714 may include the utilization of the global reflective memory map, the CPU request, and remote reflective memory write policies in order to generate Ethernet descriptors and/or any of a variety of Ethernet information and/or instructions that allow for broadcast communications (e.g., to any SCP subsystem coupled to the network 204) or multi-cast communications (e.g., to a select group of SCP subsystems coupled to the network 204) that enable the remote reflective memory write operations discussed below. Furthermore, as discussed above, memory subsystems offsets may be utilized in the generation of the remote reflective memory write information in order to address the use of different/inconsistent addressing information for the memory subsystems in the computing systems 202b or 202c by the computing system 202a. As will be appreciated by one of skill in the art in possession of the present disclosure, the generation of Ethernet information for the performance of broadcast/multi-cast communications in the present disclosure may be performed by the remote memory write sub-engine 404a provided by the hardware subsystem, and without the conventional middleware, libraries, sockets, and/or other software required by the x86 host processor in conventional reflective memory systems.

Figure 7H:
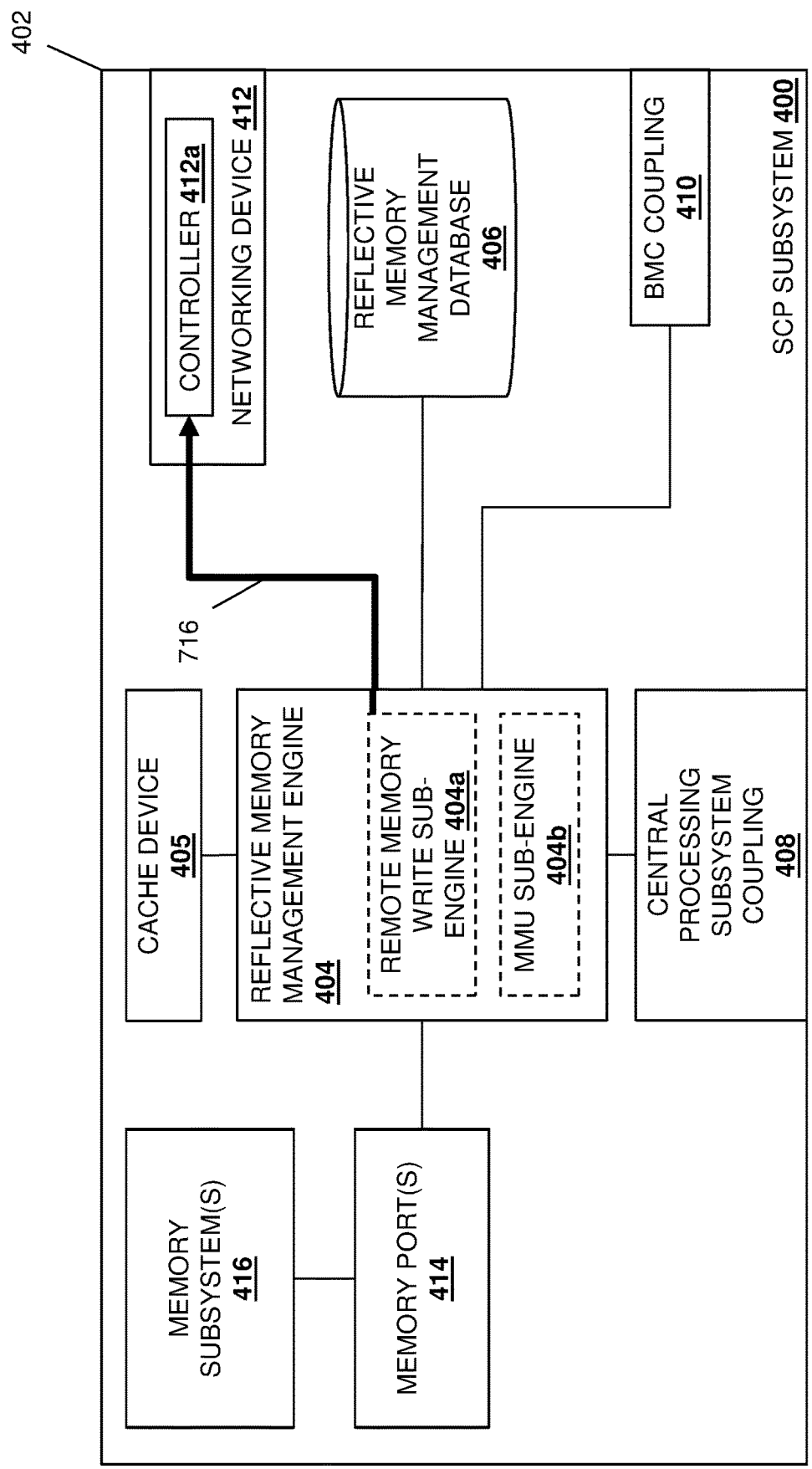
FIG. 7H is a schematic view illustrating an embodiment of the SCP subsystem of FIG. 4 operating during the method of FIG. 5.

The method 500 then proceeds to block 512 where the reflective memory management subsystem instructs a networking device to utilize the remote reflective memory write information to perform remote reflective memory write operation(s). With reference to FIG. 7H, in an embodiment of block 512, the remote memory write sub-engine 404a in the reflective memory management engine 404 that is provided by the hardware subsystem and included in the SCP subsystem 304/400 in the computing system 202a/300 may perform remote reflective memory write information utilization instruction operations 716 that include transmitting an instruction to the controller 412a in the networking device 412 to utilize the remote reflective memory write information in the reflective memory management database 406 to perform a remote reflective memory write operation.

Figure 7I:
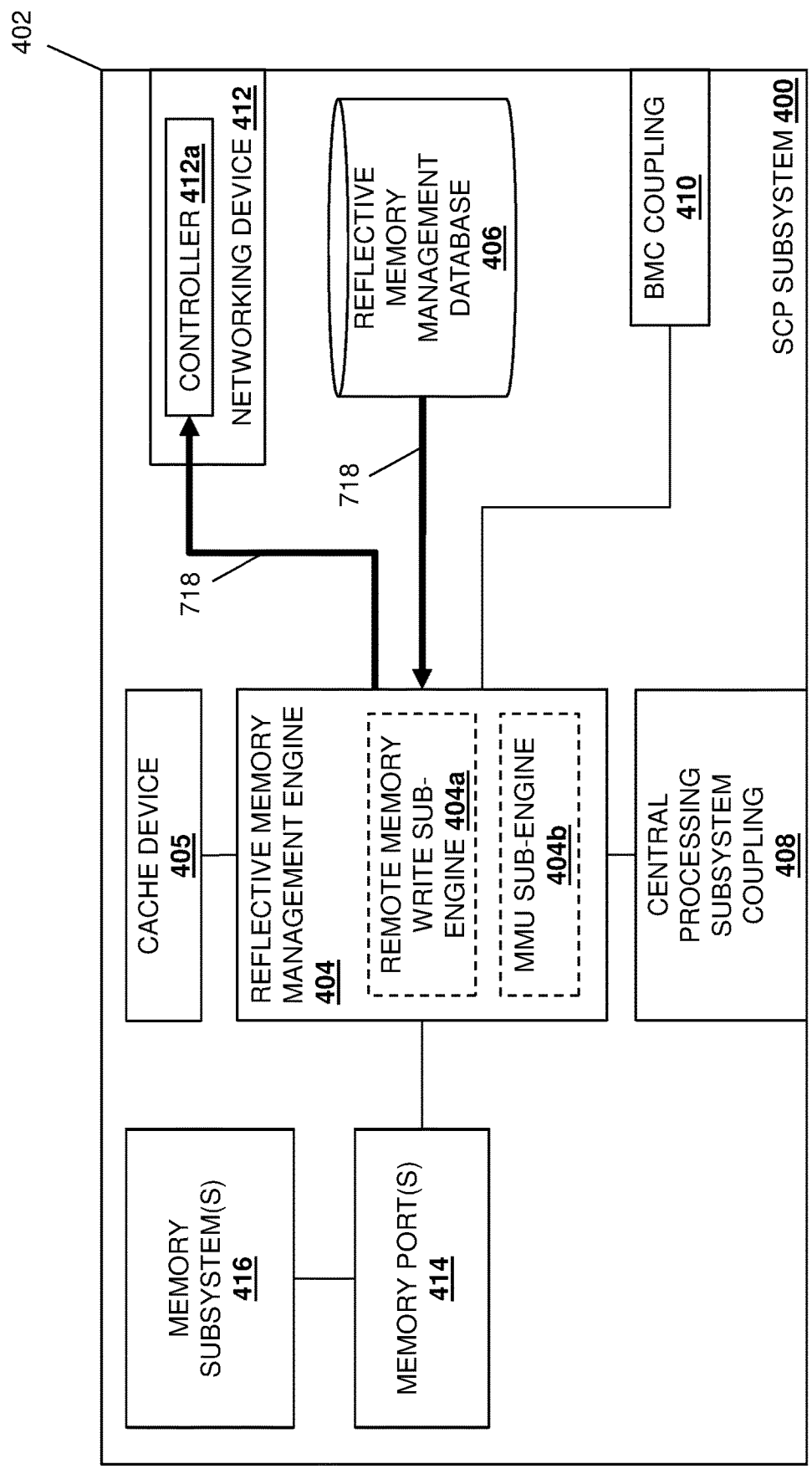
FIG. 7I is a schematic view illustrating an embodiment of the SCP subsystem of FIG. 4 operating during the method of FIG. 5.

The method 500 then proceeds to block 514 where the networking device retrieves the remote reflective memory write information and performs the remote reflective memory write operation(s). With reference to FIG. 7I, in an embodiment of block 514 and in response to receiving the instruction to utilize the remote reflective memory write information in the reflective memory management database 406 to perform a remote reflective memory write operation, the controller 412a (e.g., an Ethernet controller) in the networking device 412 in the SCP subsystem 304/400 in the computing system 202a/300 may perform remote reflective memory write information access operations 718 to access the remote reflective memory write information in the reflective memory management database 406 and use that remote reflective memory write information to perform remote reflective memory write operations.

Figure 7J:
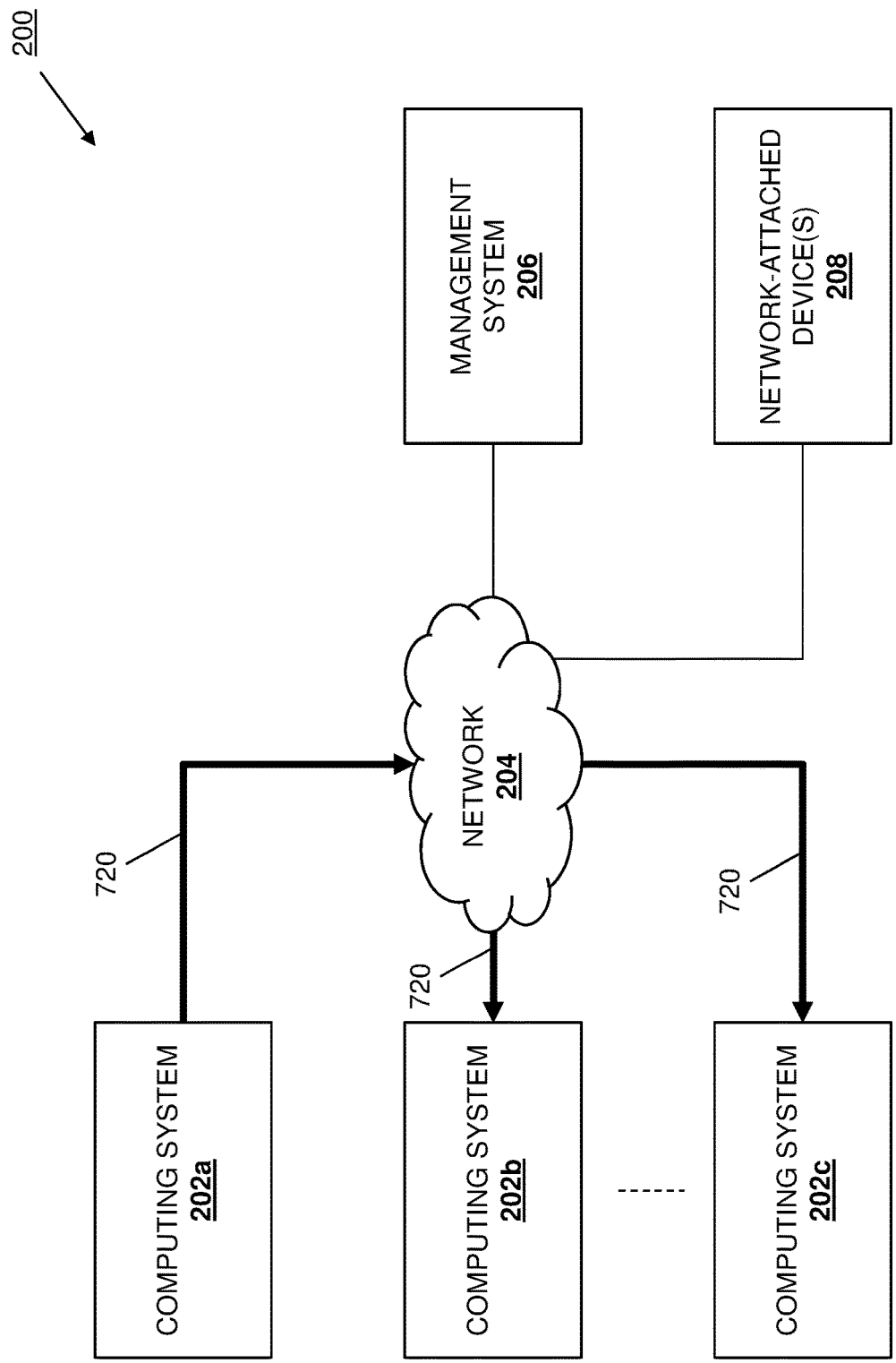
FIG. 7J is a schematic view illustrating an embodiment of the networked system of FIG. 2 operating during the method of FIG. 5.
Figure 7K:
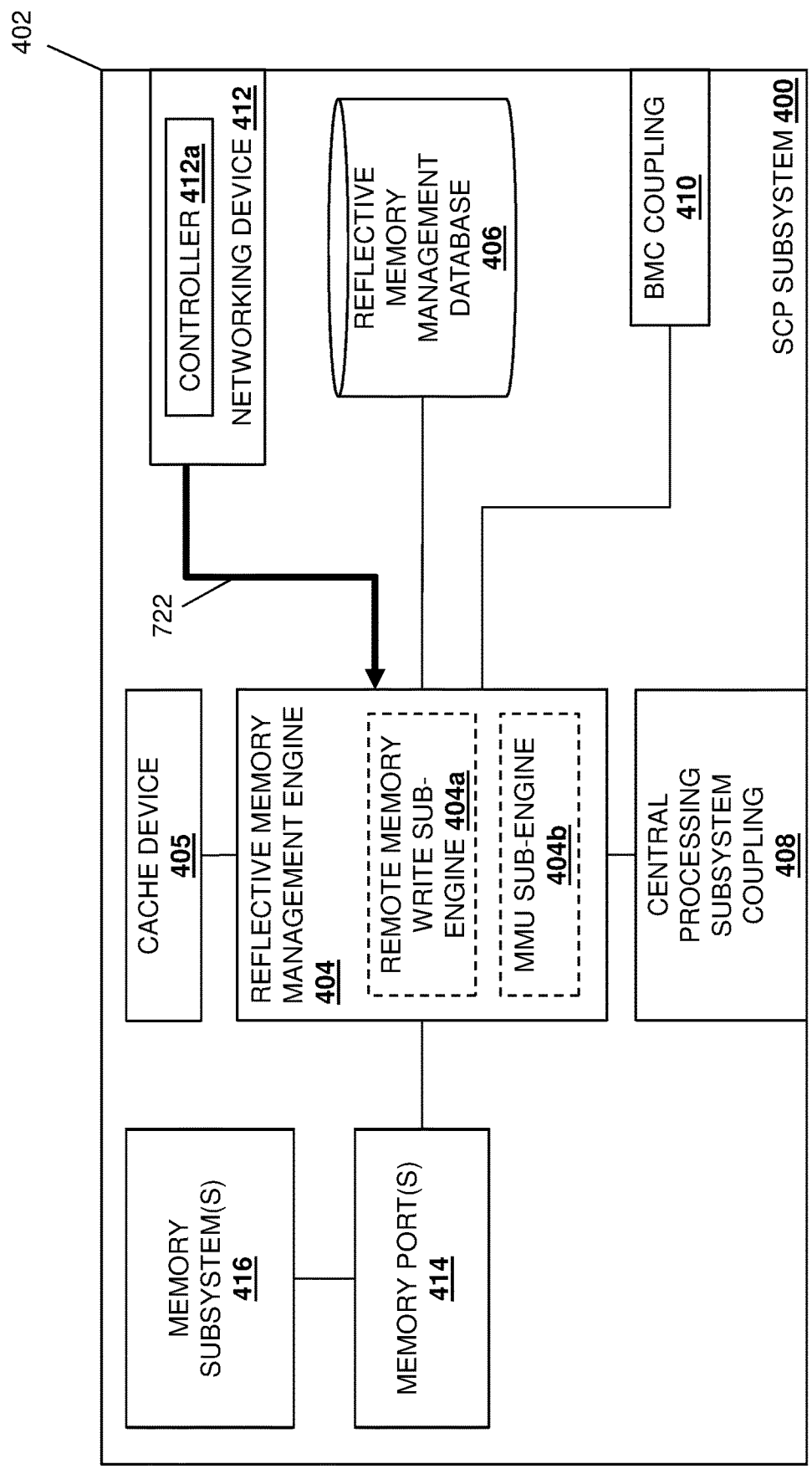
FIG. 7K is a schematic view illustrating an embodiment of the SCP subsystem of FIG. 4 operating during the method of FIG. 5.

In an embodiment, at block 514, the controller 412a in the networking device 412 in the SCP subsystem 304/400 in the computing system 202a/300 may generate broadcast or multi-cast communications using the remote reflective memory write information in SRAM provided by the reflective memory management database 406. For example, with reference to FIG. 7J, the controller 412a in the networking device 412 in the SCP subsystem 304/400 in the computing system 202a/300 may perform remote reflective memory write operations 720 that include broadcasting or multi-casting remote reflective memory write communications via the network 204 to the computing systems 202b/300 and up to 202c/300. As illustrated in FIG. 7K, the networking device 412 in the SCP subsystem 304/400 in each computing system 202b/300 and up to 202c/300 may receive those remote reflective memory write communications via the network 204 and, in response, perform remote reflective memory write communication transmission operations 722 that include transmitting the remote reflective memory write communications to the reflective memory management engine 404 in the SCP subsystem 304/400 in each of the computing systems 202b/300 and up to 202c/300.

Figure 7L:
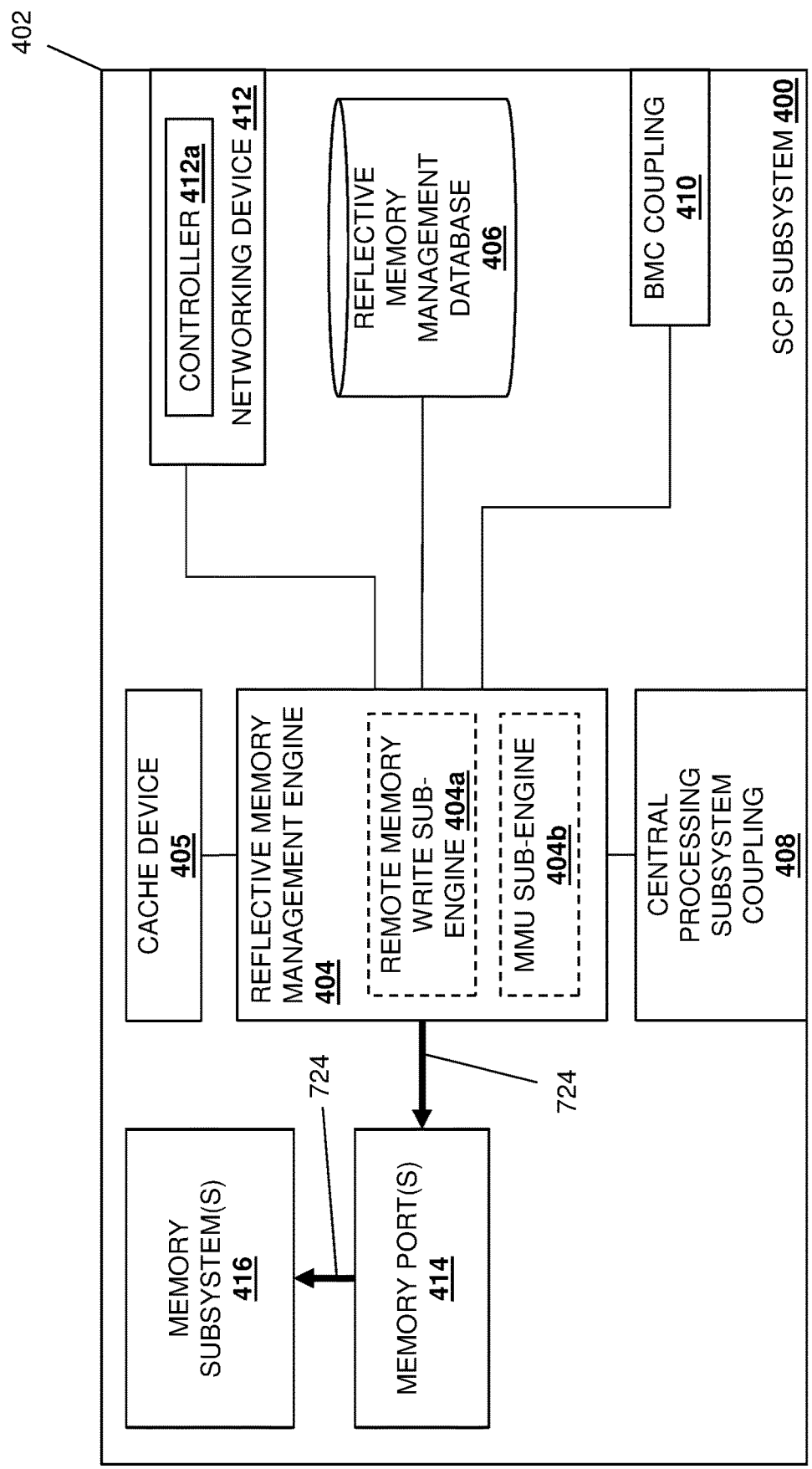
FIG. 7L is a schematic view illustrating an embodiment of the SCP subsystem of FIG. 4 operating during the method of FIG. 5.

With reference to FIG. 7L, the reflective memory management engine 404 in the SCP subsystem 304/400 in the computing system 202b/300 may receive the broadcast or multi-cast remote reflective memory write communication and, in response, perform an associated remote reflective memory write operation 724 to write data in that remote reflective memory write communication to an SCP "local" memory subsystem (e.g., with reference to the global reflective memory map 600 discussed above, to the memory address included in the reflective memory 610b that is "local" from the perspective of the SCP subsystem 604b/ computing system 604). Similarly, the reflective memory management engine 404 in the SCP subsystem 304/400 in the computing system 202c/300 may receive the broadcast or multi-cast remote reflective memory write communications and, in response, perform the associated remote reflective memory write operation 724 to write data in that remote reflective memory write communication to an SCP "local" memory subsystem (e.g., with reference to the global reflective memory map 600 discussed above, to the memory address included in the reflective memory 610c that is "local" from the perspective of the SCP subsystem 606b/ computing system 606). In some embodiments, the reflective memory management database 406 in the SCP subsystem 304/400 in each computing system 202b/300 and up to 202c/300 may include IP addresses of any SCP subsystem/ computing system in the reflective memory fabric, and at block 514 the reflective memory management engine 404 in the SCP subsystem 304/400 in each computing system 202b/300 and up to 202c/300 may use those IP addresses to verify the remote reflective memory write communication received from the SCP subsystem 304/400 in the computing system 202a/300 (e.g., by verifying that remote reflective memory write communication was received from an IP address that is included in the reflective memory fabric) before performing the associate reflective memory write operation.

The method 500 then proceeds to optional block 516 where the reflective memory management subsystem may determine a remote reflective memory write operation completion status and report it to the central processing subsystem. In an embodiment, at optional block 516, the reflective memory management engine 404 in the SCP subsystem 304/400 in each of the computing systems 202b/ 300 and up to 202c/300 may report an acknowledgement/ completion status (e.g., a successful/completed status, an unsuccessful/incomplete status, etc.) of its remote memory write operation to the reflective memory management engine 404 in the SCP subsystem 304/400 in the computing system 202a/300 that acts as a remote reflective memory write operation completion collector. As such, the reflective memory management engine 404 in the SCP subsystem 304/400 in the computing system 202a/300 may collect acknowledgements/completion statuses from each other SCP subsystem and, once each acknowledgements/completion statuses has been collected from those SCP subsystems, report a consolidated completion status to the central processing subsystem 308 in the computing system 202a/300. For example, completion status reporting operations may include the SCP subsystem 304 in the computing system 202a/300 receiving the completion status for the remote reflective memory write operations from the SCP subsystem 304 in each computing system 202b/300 and up to 202c/300 and, in response, transmitting a completion status to the central processing subsystem 308 in the computing system 202a/300, which may then transmit that completion status to the application 309 provided in the computing system 202a/ 300. As such, remote reflective memory write operations may be synchronous operations in which the application 308 is informed of the completion status (e.g., a successful/ completed status, an unsuccessful/incomplete status, etc.) of each remote reflective memory write operation performed based on its memory access request.

Thus, systems and methods have been described that provide a reflective memory system that includes memory subsystems in different network-connected server devices, and that utilizes hardware subsystems to receive and identify a processor memory-centric reflective write request and, in response, write data associated with that processor memory-centric reflective write request to a local memory subsystem while causing that data to be written to remote memory subsystems as well. For example, the reflective memory system of the present disclosure may include network-connected server devices including respective memory subsystems. An SCP subsystem in a first server device receives a processor memory-centric reflective write request associated with a local reflective memory write operation and remote reflective memory write operations, performs the local reflective memory write operation to write data to a memory subsystem in the first server device, and uses remote memory access hardware to generate remote memory write information for performing the remote reflective memory write operations to write the data at respective second memory subsystems in second server device. The SCP subsystem then instructs a networking device in the first server device to utilize the remote memory write information to transmit first memory access communications that provide for the performance of the remote reflective memory write operations to write the data at the second memory subsystem in each second server. As such, programmers may configure applications to utilize a shared memory pool of local and remote memory subsystems using memory pointer access techniques/native memory semantics, rather than programming or integrating with remote memory subsystem software stacks, resulting in reduced cost reflective memory systems that are relatively easier to scale.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A reflective memory system, comprising:
at least one second computing system, wherein each at least one second computing system includes a second memory subsystem;
a first computing system that includes a first memory subsystem and that is coupled to each at least one second computing system via a network;
a central processing subsystem that is included in the first computing system;
a networking device that is included in the first computing system; and
a reflective memory management subsystem that is included in the first computing system and coupled to the central processing subsystem and the networking device, wherein the reflective memory management subsystem is configured to:
receive, from the central processing subsystem, a processor memory-centric reflective write request associated with a local reflective memory write operation and at least one remote reflective memory write operation,
perform the local reflective memory write operation to write data to the first memory subsystem,
generate, using remote memory access hardware included in the reflective memory management subsystem, remote memory write information for performing the at least one remote reflective memory write operation to write the data at the second memory subsystem included in each at least one second computing system, and
instruct the networking device to utilize the remote memory write information to perform the at least one remote reflective memory write operation to write the data at the second memory subsystem included in each at least one second computing system to cause the networking device to transmit at least one first memory access communication that provides for the performance of the at least one remote reflective memory write operation to write the data at the second memory subsystem included in each at least one second computing system.

2. The system of claim 1, wherein the processor memory-centric reflective write request includes a memory subsystem address pointer that points to a memory address associated with the first memory subsystem.

3. The system of claim 1, wherein the reflective memory management subsystem is configured to:
receive, from the central processing subsystem, a processor memory-centric reflective read request associated with a local reflective memory read operation;
perform the local reflective memory read operation to read data from the first memory subsystem.

4. The system of claim 1, wherein the reflective memory management subsystem is configured to:
configure, prior to receiving the processor memory-centric reflective write request, a reflective memory network that includes the first memory subsystem in the first computing system and the second memory subsystem in each at least one second computing system.

5. The system of claim 1, wherein the instructing the networking device to utilize the first memory access information to perform the at least one remote reflective memory write operation to write the data at the second memory subsystem included in each at least one second computing system causes the networking device to generate and multicast a first memory access multicast communication that provides for the performance of respective reflective memory write operations to write the data at the second memory subsystem included in each of a plurality of second computing systems.

6. The system of claim 1, wherein the reflective memory management subsystem is configured to:
receive, from each at least one second computing system via the networking device, a respective remote reflective memory write operation completion status communication associated with each respective remote reflective memory write operation; and
transmit, to the central processing subsystem in response to receiving the respective remote reflective memory write operation completion status communication from each at least one second computing system, a remote reflective memory write completion status.

7. An Information Handling System (IHS), comprising:
a secondary processing subsystem; and
a secondary memory subsystem that is coupled to the secondary processing subsystem and that includes instructions that, when executed by the secondary processing subsystem, cause the secondary processing subsystem to provide a reflective memory management engine that is configured to:
receive, from a central processing subsystem, a processor memory-centric reflective write request associated with a local reflective memory write operation and at least one remote reflective memory write operation, perform the local reflective memory write operation to write data to a first memory subsystem coupled to the secondary processing subsystem, generate, using remote memory access hardware included in the secondary processing subsystem, remote memory write information for performing the at least one remote reflective memory write operation to write the data at a second memory subsystem included in each at least one second computing system that is coupled to the secondary processing subsystem via a network, and instruct a networking device that couples the secondary processing subsystem to the network to utilize the remote memory write information to perform the at least one remote reflective memory write operation to write the data at the second memory subsystem included in each at least one second computing system to cause the networking device to transmit at least one first memory access communication that provides for the performance of the at least one remote reflective memory write operation to write the data at the second memory subsystem included in each at least one second computing system.

8. The IHS of claim 7, wherein the processor memory-centric reflective write request includes a memory subsystem address pointer that points to a memory address associated with the first memory subsystem.

9. The IHS of claim 7, wherein the reflective memory management engine is configured to:

receive, from the central processing subsystem, a processor memory-centric reflective read request associated with a local reflective memory read operation;

perform the local reflective memory read operation to read data from the first memory subsystem.

10. The IHS of claim 7, wherein the reflective memory management subsystem is configured to:

configure, prior to receiving the processor memory-centric reflective write request, a reflective memory network that includes the first memory subsystem and the second memory subsystem in each at least one second computing system.

11. The IHS of claim 7, wherein the instructing the networking device to utilize the first memory access information to perform the at least one remote reflective memory write operation to write the data at the second memory subsystem included in each at least one second computing system causes the networking device to generate and multicast a first memory access multicast communication that provides for the performance of respective reflective memory write operations to write the data at the second memory subsystem included in each of a plurality of second computing systems.

12. The IHS of claim 7, wherein the reflective memory management engine is configured to:

receive, from each at least one second computing system via the networking device, a respective remote reflective memory write operation completion status communication associated with each respective remote reflective memory write operation; and transmit, to the central processing subsystem in response to receiving the respective remote reflective memory write operation completion status communication from each at least one second computing system, a remote reflective memory write completion status.

13. The IHS of claim 7, wherein the reflective memory management engine is configured to use the remote memory access hardware included in the secondary processing subsystem to generate the remote memory write information for performing the at least one remote reflective memory write operation to write the data at the second memory subsystem included in each at least one second computing system by:

accessing memory subsystem offset information; and using the memory subsystem offset information to convert a first memory address included in the first processor memory-centric reflective write request to a second memory address that is provided in the remote memory write information.

14. A method for providing reflective memory, comprising:

receiving, by a reflective memory subsystem from a central processing subsystem, a processor memory-centric reflective write request associated with a local reflective memory write operation and at least one remote reflective memory write operation;

performing, by the reflective memory subsystem, the local reflective memory write operation to write data to a first memory subsystem in the reflective memory subsystem;

generating, by the reflective memory subsystem using remote memory access hardware, remote memory write information for performing the at least one remote reflective memory write operation to write the data at a second memory subsystem included in each at least one second computing system that is coupled to the reflective memory subsystem via a network; and instructing, by the reflective memory subsystem, a networking device that couples the reflective memory subsystem to the network to utilize the remote memory write information to perform the at least one remote reflective memory write operation to write the data at the second memory subsystem included in each at least one second computing system to cause the networking device to transmit at least one first memory access communication that provides for the performance of the at least one remote reflective memory write operation to write the data at the second memory subsystem included in each at least one second computing system.

15. The method of claim 14, wherein the processor memory-centric reflective write request includes a memory subsystem address pointer that points to a memory address associated with the first memory subsystem.

16. The method of claim 14, further comprising:

receiving, by the reflective memory subsystem from the central processing subsystem, a processor memory-centric reflective read request associated with a local reflective memory read operation;

performing, by the reflective memory subsystem, the local reflective memory read operation to read data from the first memory subsystem.

17. The method of claim 14, further comprising:

configuring, by the reflective memory subsystem prior to receiving the processor memory-centric reflective write request, a reflective memory network that includes the first memory subsystem and the second memory subsystem in each at least one second computing system.

18. The method of claim 14, wherein the instructing the networking device to utilize the first memory access information to perform the at least one remote reflective memory write operation to write the data at the second memory subsystem included in each at least one second computing system causes the networking device to generate and multicast a first memory access multicast communication that provides for the performance of respective reflective memory write operations to write the data at the second memory subsystem included in each of a plurality of second computing systems.

19. The method of claim 14, further comprising:
- receiving, by the reflective memory subsystem from each at least one second computing system via the networking device, a respective remote reflective memory write operation completion status communication associated with each respective remote reflective memory write operation; and
- transmitting, by the reflective memory subsystem to the central processing subsystem in response to receiving the respective remote reflective memory write operation completion status communication from each at least one second computing system, a remote reflective memory write completion status.

20. The method of claim 14, wherein the reflective memory management subsystem uses the remote memory access hardware to generate the remote memory write information for performing the at least one remote reflective memory write operation to write the data at the second memory subsystem included in each at least one second computing system by:
- accessing memory subsystem offset information; and
- using the memory subsystem offset information to convert a first memory address included in the first processor memory-centric reflective write request to a second memory address that is provided in the remote memory write information.

* * * * *